US012656038B1

(12) United States Patent
Latham et al.

(10) Patent No.: US 12,656,038 B1
(45) Date of Patent: Jun. 16, 2026

(54) FLUX WEAKENING FOR A SINGLE PHASE LINEAR COMPRESSOR

(71) Applicant: Haier US Appliance Solutions, Inc., Wilmington, DE (US)

(72) Inventors: Joseph Wilson Latham, Louisville, KY (US); Gregory William Hahn, Mt. Washington, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 19/070,698

(22) Filed: Mar. 5, 2025

(51) Int. Cl.
| | |
|---|---|
| *F25B 49/02* | (2006.01) |
| *F04B 49/20* | (2006.01) |
| *H02P 21/00* | (2016.01) |
| *H02P 21/26* | (2016.01) |

(52) U.S. Cl.
CPC ............ *F25B 49/025* (2013.01); *F04B 49/20* (2013.01); *H02P 21/0089* (2013.01); *H02P 21/26* (2016.02)

(58) Field of Classification Search
CPC ........ F04B 49/06; F04B 35/04; F04B 35/045; F04B 49/065; F04B 49/20; F25B 31/023; F25B 2600/024; F25B 2700/151; F25B 1/02; F25B 49/025; H02P 21/0089; H02P 21/26
See application file for complete search history.

(56) References Cited

U.S. PATENT DOCUMENTS

| | | | |
|---|---|---|---|
| 6,753,665 B2 | 6/2004 | Ueda et al. | |
| 6,793,167 B2 | 9/2004 | Karkos, Jr. et al. | |

| | | | |
|---|---|---|---|
| 6,864,647 B2 | 3/2005 | Duncan et al. | |
| 6,949,900 B1 | 9/2005 | Berringer | |
| 7,025,571 B2 | 4/2006 | Jeun | |
| 7,045,988 B2 | 5/2006 | Ha et al. | |
| 7,301,298 B2 | 11/2007 | Shao et al. | |
| 7,550,941 B2 | 6/2009 | Dainez et al. | |

(Continued)

FOREIGN PATENT DOCUMENTS

| | | |
|---|---|---|
| CN | 103812390 A | 5/2014 |
| CN | 104333273 B | 2/2017 |

(Continued)

OTHER PUBLICATIONS

English translation and Original Document of CN 107395085 (Year: 2026).*

(Continued)

*Primary Examiner* — Dominick L Plakkoottam

(74) *Attorney, Agent, or Firm* — Dority & Manning, P.A.

(57) ABSTRACT

A method for operating a linear compressor of an appliance is provided. The method includes operating a motor of the linear compressor in order to drive a rotor of the motor. The method also include obtaining, via a controller of the linear compressor, a voltage feedback measurement of the motor. Further, the method includes adjusting, via the controller, a control setpoint for the motor based on the voltage feedback measurement and a voltage threshold. In addition, the method includes controlling, via the controller, the motor of the linear compressor based, at least in part, on the adjusted control setpoint so as to implement a flux weakening operation when the voltage feedback measurement is greater than or equal to the voltage threshold.

20 Claims, 14 Drawing Sheets

(56) References Cited

U.S. PATENT DOCUMENTS

| | | | |
|---|---|---|---|
| 8,100,668 | B2 | 1/2012 | Yoo et al. |
| 8,339,081 | B2 | 12/2012 | Patel et al. |
| 8,704,469 | B2 | 4/2014 | Tadano |
| 9,143,066 | B2 | 9/2015 | Yang et al. |
| 9,397,596 | B2 | 7/2016 | Baker |
| 9,399,991 | B2 | 7/2016 | Dainez et al. |
| 9,518,578 | B2 | 12/2016 | Dainez et al. |
| 9,742,330 | B2 | 8/2017 | Yamada et al. |
| 9,780,718 | B2 | 10/2017 | Barfus et al. |
| 9,850,890 | B2 | 12/2017 | Lim et al. |
| 10,111,558 | B2 | 10/2018 | Dickson, Jr. et al. |
| 10,174,753 | B2 | 1/2019 | Kusumba et al. |
| 10,273,948 | B1 | 4/2019 | Goodjohn et al. |
| 10,622,870 | B2 | 4/2020 | Campbell et al. |
| 11,329,590 | B2 | 5/2022 | Pullen |
| 11,374,519 | B2 | 6/2022 | Yajurvedi et al. |
| 11,406,224 | B2 | 8/2022 | Cunningham |
| 11,434,883 | B2 | 9/2022 | Latham et al. |
| 11,444,558 | B1 | 9/2022 | Latham et al. |
| 11,563,347 | B2 | 1/2023 | Pennington et al. |
| 11,677,346 | B2 | 6/2023 | Li et al. |
| 11,711,039 | B2 * | 7/2023 | Takahashi ........... H02P 21/0089 318/400.02 |
| 2004/0245949 | A1 * | 12/2004 | Ueda ......................... H02P 6/15 318/400.14 |
| 2005/0023905 | A1 * | 2/2005 | Sakamoto .............. H02K 33/16 310/12.17 |
| 2008/0001571 | A1 | 1/2008 | Tomigashi |
| 2010/0148710 | A1 | 6/2010 | Lim et al. |
| 2013/0193886 | A1 | 8/2013 | Yoon et al. |
| 2013/0287602 | A1 | 10/2013 | Suzuki et al. |
| 2016/0254771 | A1 | 9/2016 | Qiao et al. |
| 2017/0207733 | A1 * | 7/2017 | Matsuyama ........ F04B 39/0207 |
| 2019/0186480 | A1 | 6/2019 | Kulkarni et al. |
| 2020/0228037 | A1 * | 7/2020 | Black ...................... H02P 21/36 |
| 2020/0266743 | A1 * | 8/2020 | Li ......................... G06N 3/0499 |
| 2020/0362842 | A1 | 11/2020 | Hahn et al. |
| 2021/0050807 | A1 | 2/2021 | Xu et al. |
| 2021/0259472 | A1 | 8/2021 | Seidler et al. |
| 2022/0006403 | A1 * | 1/2022 | Sasaki ................. H02P 21/0089 |
| 2022/0120292 | A1 | 4/2022 | Brewer et al. |
| 2022/0376639 | A1 | 11/2022 | Latham et al. |
| 2023/0060458 | A1 * | 3/2023 | Li ............................ H02P 21/22 |
| 2024/0271613 | A1 | 8/2024 | Latham |

FOREIGN PATENT DOCUMENTS

| | | | | | |
|---|---|---|---|---|---|
| CN | 107395085 | A | * | 11/2017 | .............. H02P 27/08 |
| CN | 108347207 | A | | 7/2018 | |
| CN | 106357183 | B | | 9/2018 | |
| CN | 106655940 | B | | 5/2019 | |
| CN | 110323984 | A | | 10/2019 | |
| CN | 111425383 | A | | 7/2020 | |
| CN | 111464084 | A | | 7/2020 | |
| CN | 109617483 | B | | 10/2020 | |
| CN | 110518852 | B | | 10/2021 | |
| CN | 113676106 | A | | 11/2021 | |
| CN | 112187126 | B | | 4/2023 | |
| CN | 116232163 | A | | 6/2023 | |
| EP | 1446579 | B1 | | 10/2005 | |
| EP | 3098449 | A1 | | 11/2016 | |
| EP | 3883121 | A1 | | 9/2021 | |
| EP | 3926817 | A1 | * | 12/2021 | .............. F04B 49/20 |
| JP | 2006304452 | A | | 11/2006 | |
| KR | 100588719 | B1 | | 3/2006 | |
| WO | WO2013188940 | A2 | | 12/2013 | |
| WO | WO-2018102872 | A1 | * | 6/2018 | .............. H02P 21/26 |

OTHER PUBLICATIONS

G. Xingye et al., "Analysis and dynamic decoupling control schemes for PMSM current Loop", IEEE International Conference on Aircraft Utility Systems, Oct. 2016, Beijing, China, pp. 570-574.

M. J. Corley et al., "Rotor position and velocity estimation for a salient-pole permanent magnet synchronous machine at standstill and high speeds," in IEEE Transactions on Industry Applications, Jul.-Aug. 1998, vol. 34, No. 4, pp. 784-789.

S. D. Sudhoff et al., "A flux-weakening strategy for current-regulated surface-mounted permanent-magnet machine drives," in IEEE Transactions on Energy Conversion, Sep. 1995, vol. 10, No. 3, pp. 431-437.

Y. Zhang et al., "Adaptive PI parameter of flux-weakening controller based on voltage feedback for model predictive control of SPMSM", 2020 IEEE Energy Conversion Congress and Exposition, Oct. 2020, pp. 2674-2681. (Abstract Only).

Z. Zhang et al., "Flux-Weakening in PMSM Drives: Analysis of Voltage Angle Control and the Single Current Controller Design", IEEE Journal of Emerging and Selected Topics in Power Electronics, May 2018, pp. 437-445.

* cited by examiner

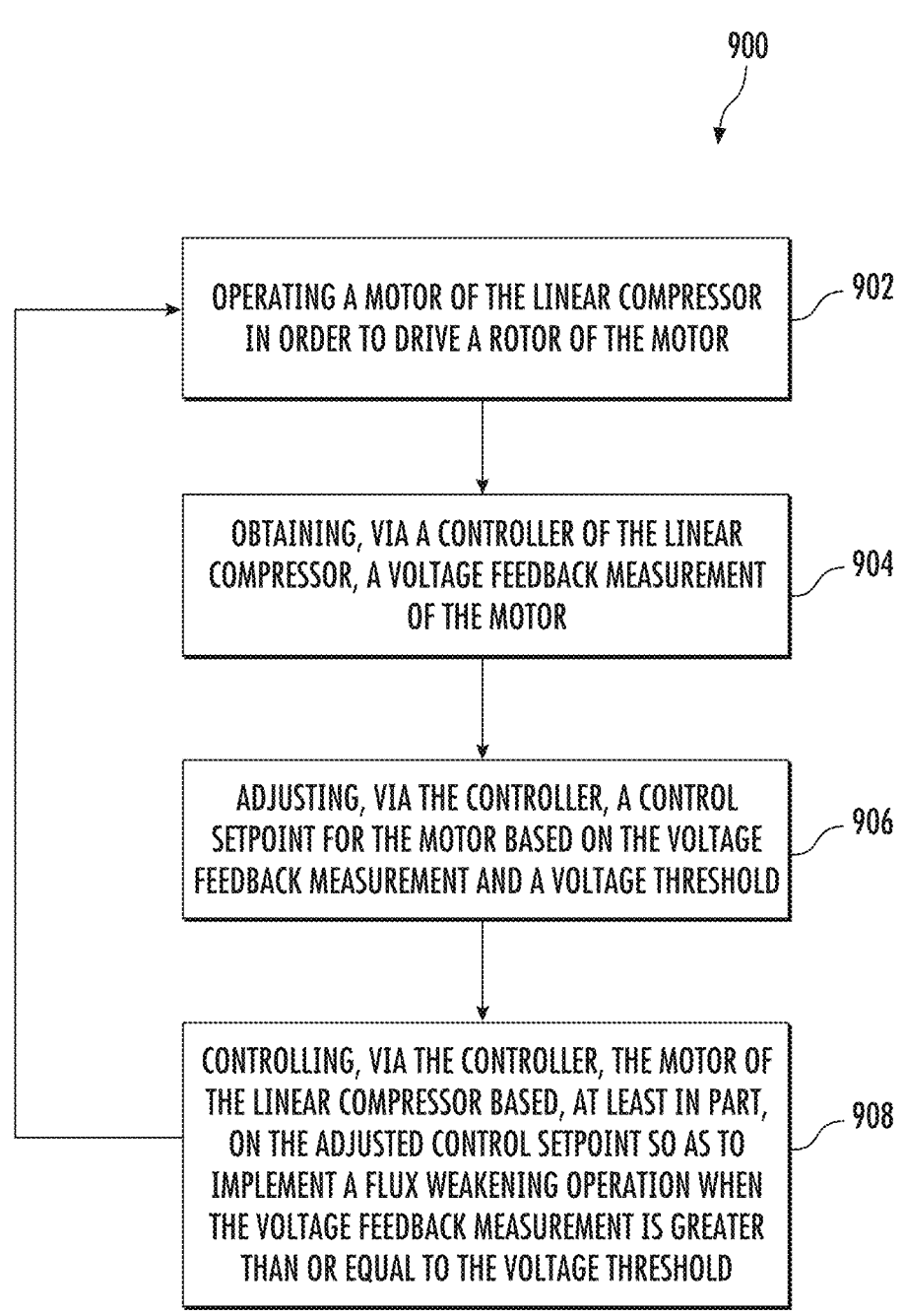

900

OPERATING A MOTOR OF THE LINEAR COMPRESSOR IN ORDER TO DRIVE A ROTOR OF THE MOTOR — 902

OBTAINING, VIA A CONTROLLER OF THE LINEAR COMPRESSOR, A VOLTAGE FEEDBACK MEASUREMENT OF THE MOTOR — 904

ADJUSTING, VIA THE CONTROLLER, A CONTROL SETPOINT FOR THE MOTOR BASED ON THE VOLTAGE FEEDBACK MEASUREMENT AND A VOLTAGE THRESHOLD — 906

CONTROLLING, VIA THE CONTROLLER, THE MOTOR OF THE LINEAR COMPRESSOR BASED, AT LEAST IN PART, ON THE ADJUSTED CONTROL SETPOINT SO AS TO IMPLEMENT A FLUX WEAKENING OPERATION WHEN THE VOLTAGE FEEDBACK MEASUREMENT IS GREATER THAN OR EQUAL TO THE VOLTAGE THRESHOLD — 908

FIG. 9

FLUX WEAKENING FOR A SINGLE PHASE LINEAR COMPRESSOR

FIELD

Example aspects of the present disclosure relate to linear compressors, such as linear compressors for refrigerators and other appliances.

BACKGROUND

Generally, refrigerator appliances include a cabinet that defines one or more chilled chambers, such as a fresh food chamber for receipt of food items for storage and/or a freezer chamber for receipt of food items for freezing and storage. Certain refrigerator appliances may also include sealed systems for cooling such chilled chambers thereof. The sealed systems generally include a linear compressor that generates compressed refrigerant during operation thereof. The compressed refrigerant flows to an evaporator where heat exchanges between the chilled chambers and the refrigerant cools the chilled chambers and food items located therein.

Linear compressors generally include a piston within a housing and a driving coil that generates a force for moving the piston forward and backward within the housing. During motion of the piston within the housing, the piston compresses the refrigerant. Furthermore, linear compressors are generally operated a single-phase motor driven by a single-phase variable-frequency drive. The variable-frequency drive is a type of motor drive that is used to control the motor speed and force by varying motor voltage input frequency and amplitude.

SUMMARY

Aspects and advantages of embodiments of the present disclosure will be set forth in part in the following description, or can be learned from the description, or can be learned through practice of the embodiments.

In one exemplary aspect of the present disclosure, a method for operating a linear compressor of an appliance is provided. The method includes operating a motor of the linear compressor in order to drive a rotor of the motor. The method also include obtaining, via a controller of the linear compressor, a voltage feedback measurement of the motor. Further, the method includes adjusting, via the controller, a control setpoint for the motor based on the voltage feedback measurement and a voltage threshold. In addition, the method includes controlling, via the controller, the motor of the linear compressor based, at least in part, on the adjusted control setpoint so as to implement a flux weakening operation when the voltage feedback measurement is greater than or equal to the voltage threshold.

In one exemplary aspect of the present disclosure, a linear compressor defining an axial direction and a vertical direction is provided. The linear compressor for an appliance includes a cylindrical casing defining a compressor chamber. The linear compressor also includes a piston positioned within the compressor chamber and being movable along the axial direction. Further, the linear compressor includes a motor operably coupled to the piston. In addition, the linear compressor includes a controller configured to perform operations for controlling the motor. The operations include operating the motor in order to drive a rotor of the motor. The operations also include obtaining a voltage feedback measurement of the motor. Further, the operations include adjusting a control setpoint for the motor so as to implement a flux weakening operation based on the voltage feedback measurement and a voltage threshold. In addition, the operations include controlling the motor based, at least in part, on the adjusted control setpoint when the voltage feedback measurement is greater than or equal to the voltage threshold.

In one exemplary aspect of the present disclosure, an appliance is provided. The appliance includes a cabinet defining an internal chamber. The appliance also includes a door rotatably mounted to the cabinet to provide selective access to the internal chamber. Further, the appliance include a linear compressor. The linear compressor includes a piston movable in a negative axial direction toward a compressor chamber and a positive axial direction away from the compressor chamber. Furthermore, the appliance includes a motor operably coupled to the piston. Moreover, the appliance includes an inverter configured to supply a variable frequency waveform to the motor. In addition, the appliance includes a controller configured to perform operations for controlling the motor. The operations include operating the motor in order to drive a rotor of the motor. The operations also include obtaining a voltage feedback measurement of the motor. Further, the operations include adjusting a control setpoint for the motor so as to implement a flux weakening operation based on the voltage feedback measurement and a voltage threshold. In addition, the operations include controlling the motor based, at least in part, on the adjusted control setpoint when the voltage feedback measurement is greater than or equal to the voltage threshold.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 9 depicts an example method for operating a linear compressor according to example embodiments of the present disclosure;

Figure 1:
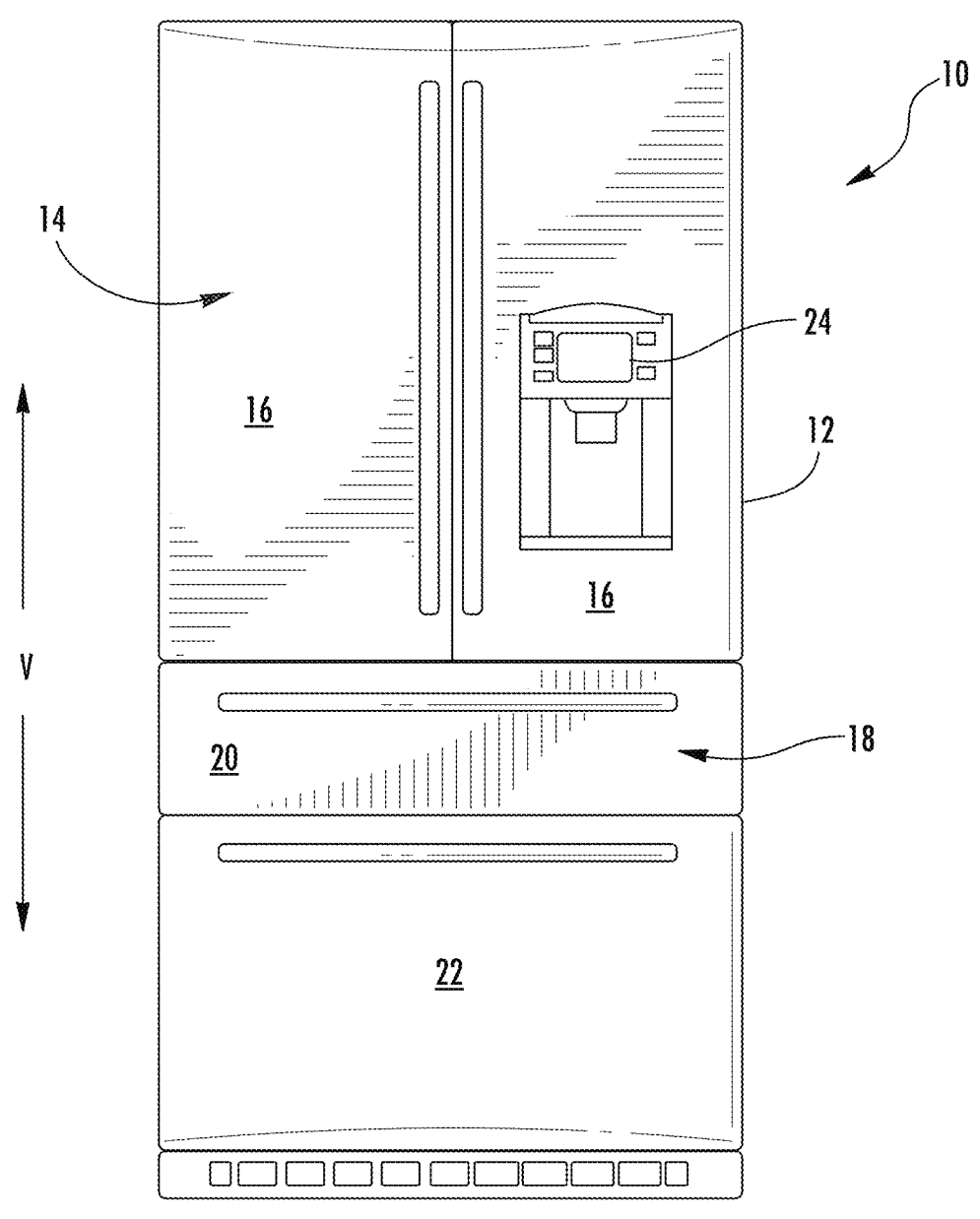
FIG. 1 depicts a front elevation view of a refrigerator appliance according to example embodiments of the present disclosure.

Repeat use of reference characters in the present specification and drawings is intended to represent the same and/or analogous features or elements of the present invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure relate generally to linear compressors such as, e.g., linear compressors for refrigerators and other appliances.

At steady-state, the linear compressor can be configured to drive a motor so as to achieve the most stroke for the least amount of current. However, the stroke at which the motor can be driven is limited by the voltage that can be applied by the inverter and the voltage required by the motor which is primarily determined by back electromotive force (back-EMF) of the motor. More particularly, to drive the motor, the inverter must overcome the back-EMF of the motor, and the back-EMF of the motor is proportional to the stroke of the motor. Hence, at a certain stroke, the inverter will not be able to provide increased voltage and will not be able to stroke the motor any further.

As such, in order to optimally drive the linear compressor, a phase between motor current and back-EMF of the motor must be manipulated. This same principle can apply to three-phase motors (e.g., brushless direct current (BLDC) motors, permanent magnet synchronous motors (PMSM)). In the case of three-phase motors, the phase between motor current and back-EMF can be controlled by a controller implementing a field-oriented control (FOC) control scheme. FOC control schemes define two components of a target current of the motor-a direct current (i.e., d-axis current) component and a quadrature current (e.g., q-axis current) component. Furthermore, FOC control schemes may provide high efficiency for and high-fidelity speed and/or position control. However, FOC control schemes are implemented in three-phase control systems. Accordingly, a linear compressor implementing a control scheme similar to a three-phase FOC control scheme is desired.

According to example aspects of the present disclosure, an appliance (e.g., a refrigerator appliance) can include a single-phase linear compressor driven by a single-phase linear motor. The linear compressor can implement a control scheme to adjust a control setpoint for controlling the motor based, at least in part, on a voltage feedback measurement and a voltage threshold. Furthermore, the control scheme can control the motor based on the adjusted control setpoint so as to implement a flux weakening operation.

The systems and methods according to example embodiments of the present disclosure provide a number of technical effects and benefits. For instance, example aspects of the present disclosure provide a control scheme that can implement flux weakening operations when the voltage feedback measurement is greater than or equal to the voltage threshold. As such, the control scheme can control the motor similar to a three-phase field-oriented control scheme. Furthermore, by implementing the control scheme, example aspects of the present disclosure provide stable and robust control of the linear compressor. Additionally, example aspects of the present disclosure allow for decoupling of stroke and/or flux weakening control, thereby providing a higher degree of control than that provided by conventional control schemes for single-phase linear compressors. In this way, example aspects of the present disclosure provide more flexibility in the control algorithms that can be implemented to control the linear compressor.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (e.g., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclock-wise, with the vertical direction V.

The word "exemplary" is used herein to mean "serving as an example, instance, or illustration." In addition, references to "an embodiment" or "one embodiment" does not neces-sarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
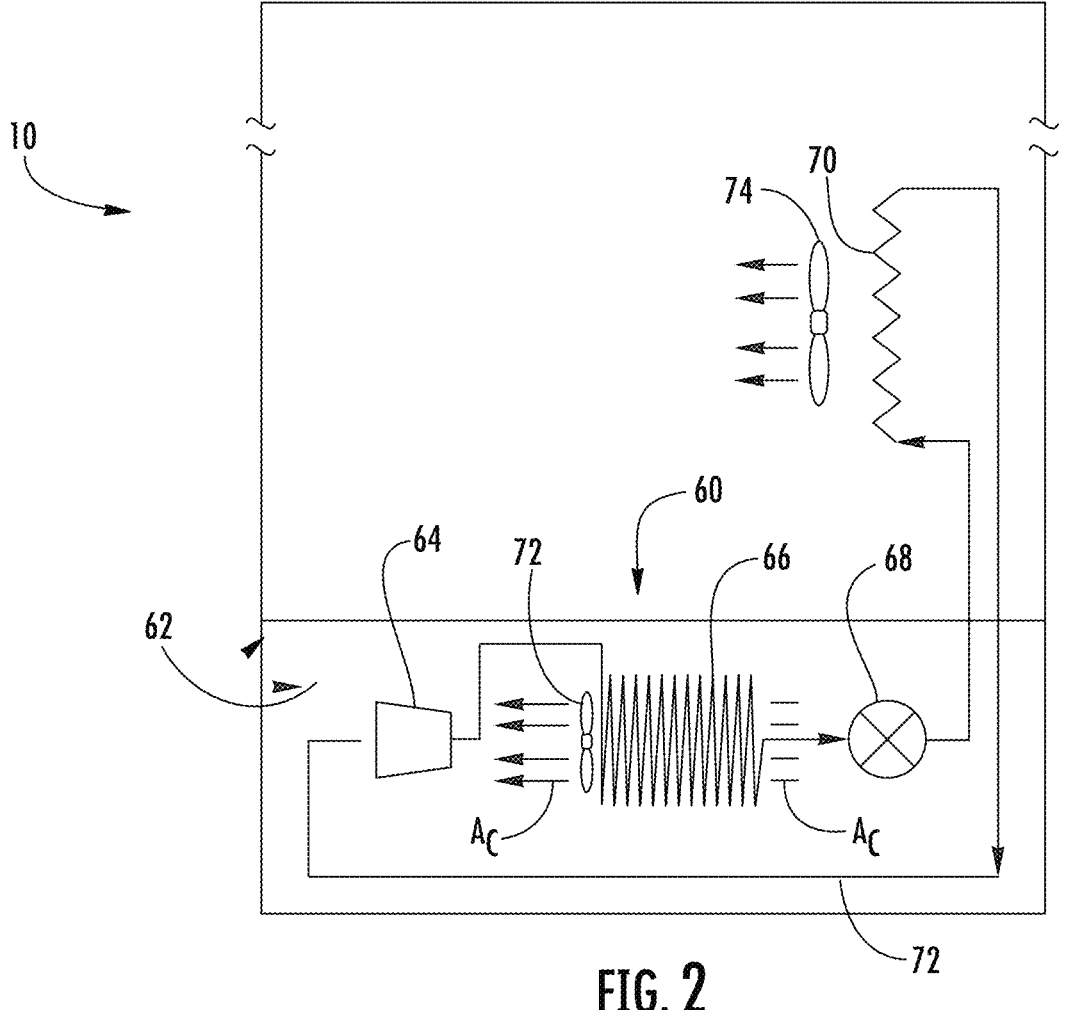
FIG. 2 depicts a schematic view of certain components of the example refrigerator appliance of FIG. 1 according to example embodiments of the present disclosure.

FIG. 1 depicts a refrigerator appliance 10 that incorpo-rates a sealed refrigeration system 60 (FIG. 2). It should be appreciated that the term "refrigerator appliance" is used in a generic sense herein to encompass any manner of refrig-eration appliance, such as a freezer, refrigerator/freezer combination, and any style or model of conventional refrig-erator. In addition, it should be understood that the present subject matter is not limited to use in refrigerator appliances. Thus, the present subject matter may be used for any other suitable purpose, such as vapor compression within air conditioning units or air compression within air compres-sors.

In the illustrated example embodiment shown in FIG. 1, the refrigerator appliance 10 is depicted as an upright refrigerator having a cabinet 12 that defines a number of internal chilled storage compartments. In particular, refrig-erator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms. Due to the doors 16 being rotatably mounted to the cabinet 12, the doors 16 provide selective access to the internal chamber. As used herein, "internal chamber" refers to the internal chilled storage compartments defined by the cabinet 12.

FIG. 2 is a schematic view of certain components of refrigerator appliance 10, including a sealed refrigeration system 60 of refrigerator appliance 10. A machinery com-partment 62 contains components for executing a known vapor compression cycle for cooling air. The components include a compressor 64, a condenser 66, an expansion device 68, and an evaporator 70 connected in series by fluid conduit 72 that is charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 74 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant con-tained therein.

An expansion device 68 (e.g., a valve, capillary tube, or other restriction device) receives refrigerant from condenser 66. From expansion device 68, the refrigerant enters evapo-rator 70. Upon exiting expansion device 68 and entering evaporator 70, the refrigerant drops in pressure. Due to the pressure drop and/or phase change of the refrigerant, evapo-rator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evapo-rator 70 to refrigerant flowing through evaporator 70.

Collectively, the vapor compression cycle components in a refrigeration circuit, associated fans, and associated com-partments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

As described above, sealed refrigeration system 60 per-forms a vapor compression cycle to refrigerate compart-ments 14, 18 of refrigerator appliance 10. However, as is understood in the art, refrigeration system 60 is a sealed system that may be alternately operated as a refrigeration assembly (and thus perform a refrigeration cycle as described above) or a heat pump (and thus perform a heat pump cycle). Thus, for example, aspects of the present subject matter may similarly be used in a sealed system for an air conditioner unit, e.g., to perform by a refrigeration or cooling cycle and a heat pump or heating cycle. In this regard, when a sealed system is operating in a cooling mode and thus performs a refrigeration cycle, an indoor heat exchanger acts as an evaporator and an outdoor heat exchanger acts as a condenser. Alternatively, when the sealed system is operating in a heating mode and thus performs a heat pump cycle, the indoor heat exchanger acts as a condenser and the outdoor heat exchanger acts as an evaporator.

Figure 3:
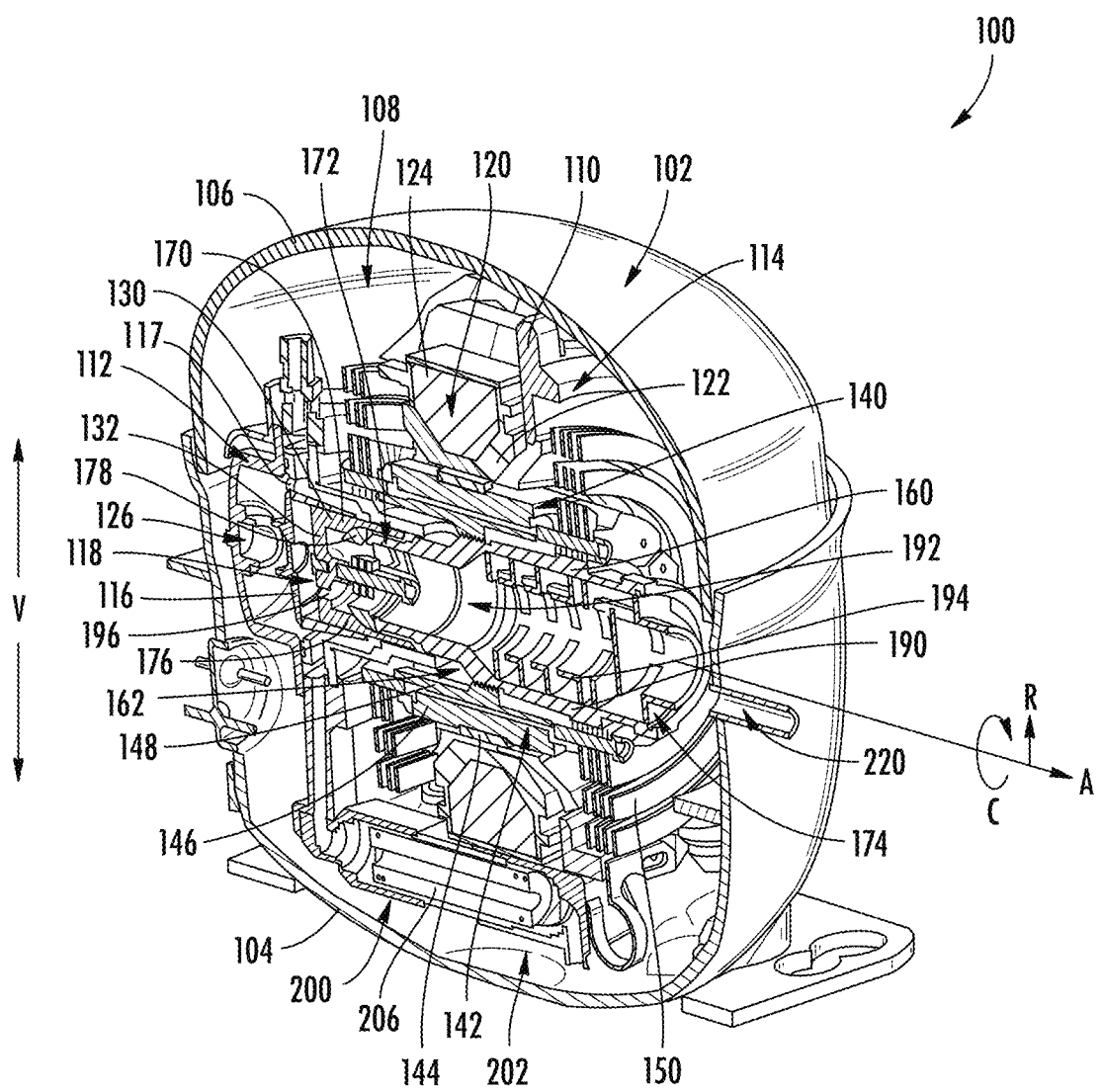
FIG. 3 depicts a perspective, section view of a linear compressor according to an exemplary embodiment of the present subject matter.
Figure 4:
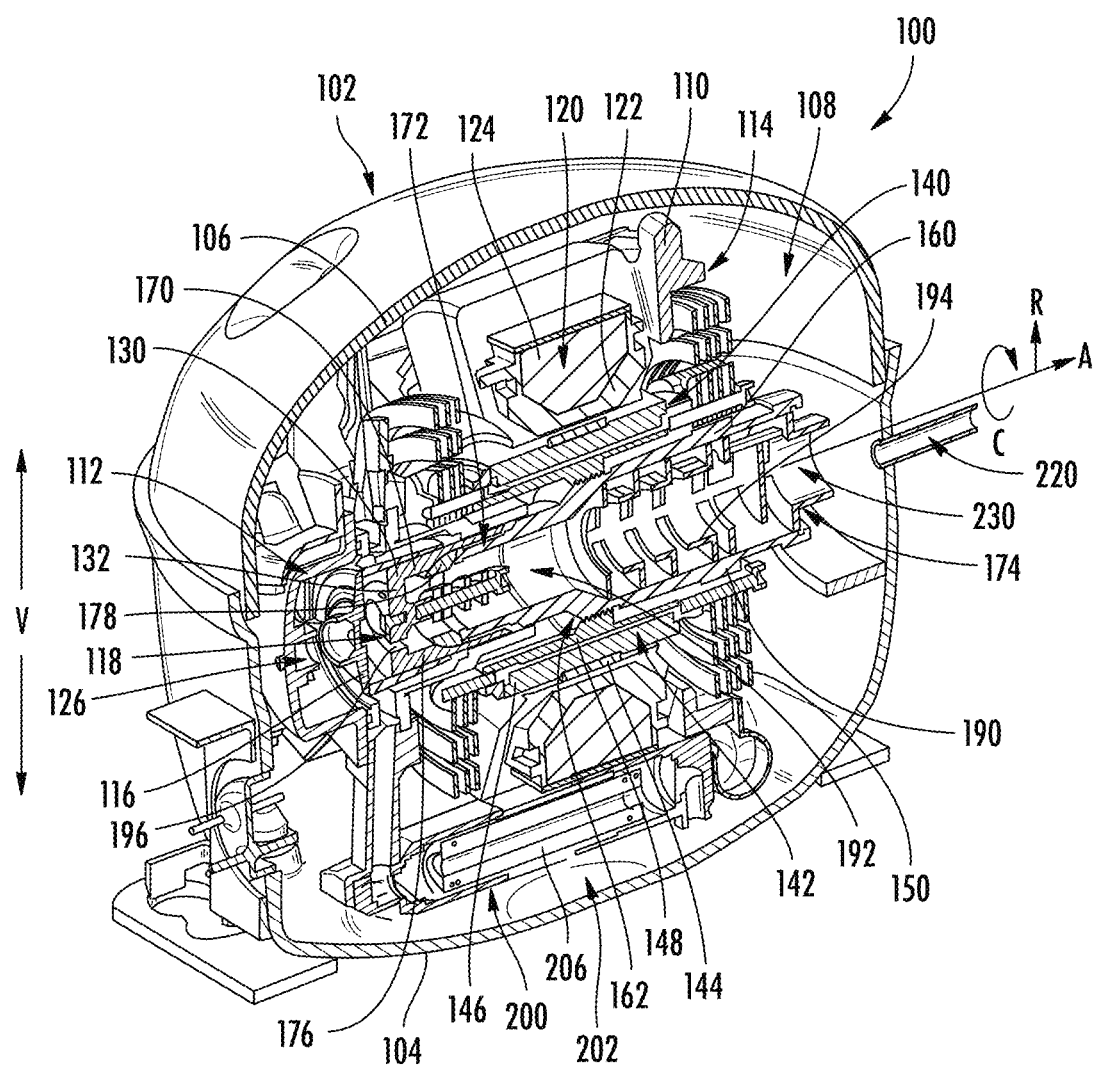
FIG. 4 depicts another perspective, section view of the exemplary linear compressor of FIG. 3 according to an embodiment of the present subject matter.
Figure 5:
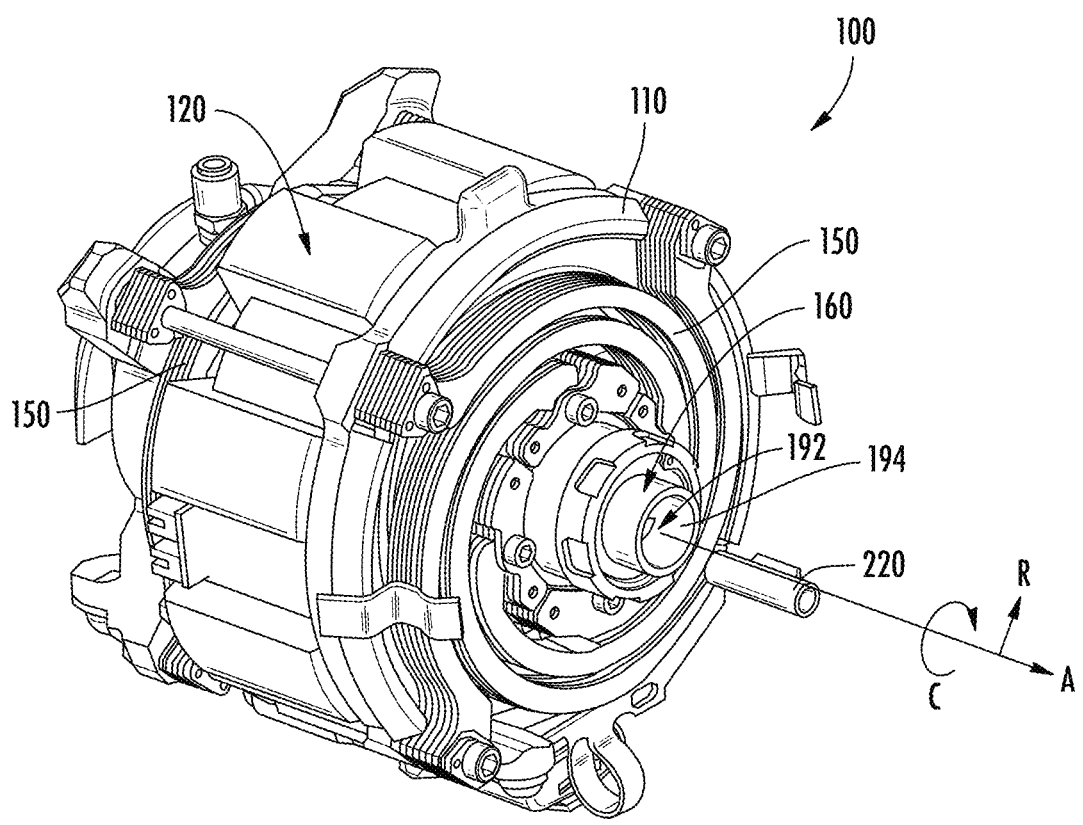
FIG. 5 depicts a perspective view of a linear compressor with a compressor housing removed for clarity according to an example embodiment of the present subject matter.
Figure 6:
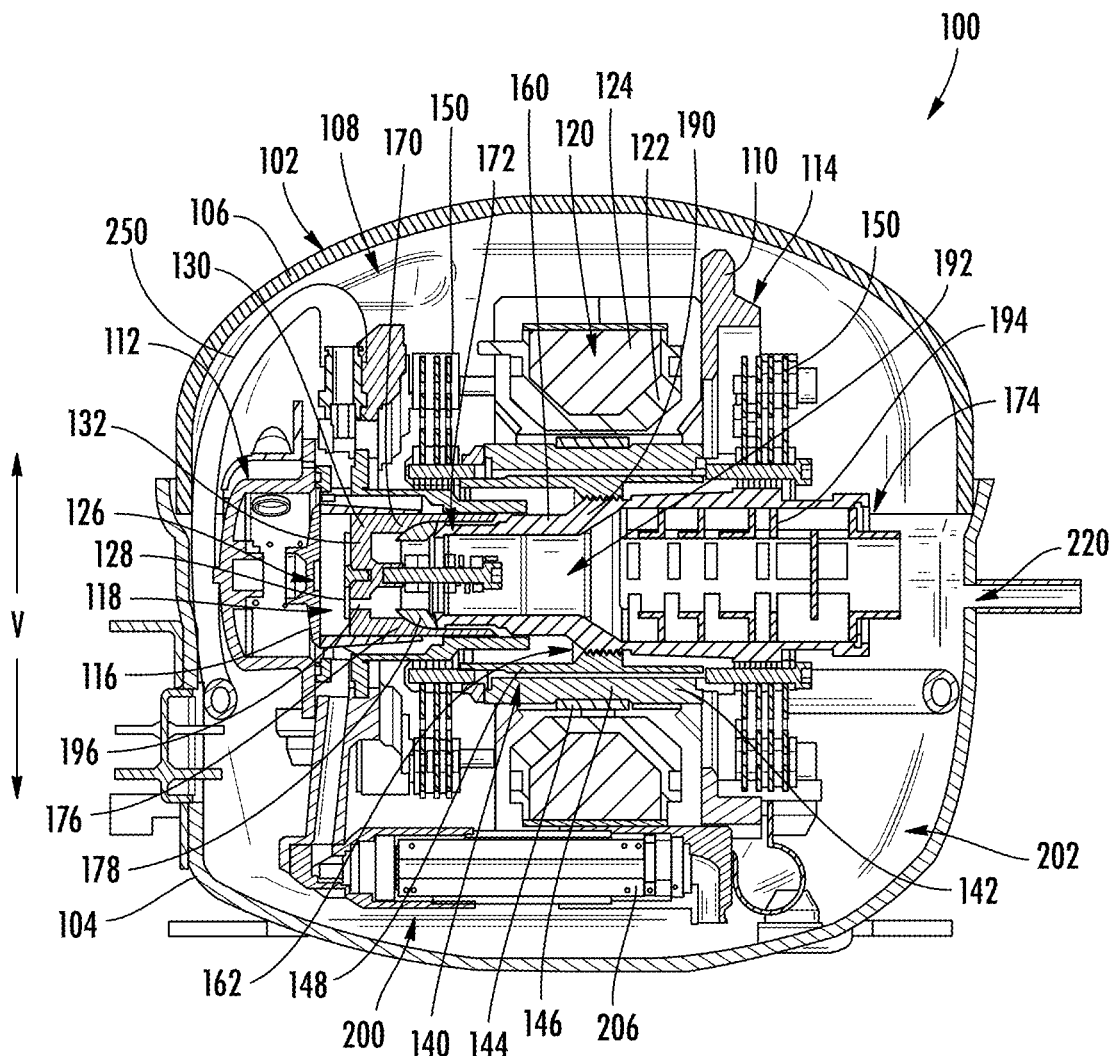
FIG. 6 depicts a section view of the exemplary linear compressor of FIG. 3 with a piston in an extended position according to an embodiment of the present subject matter.
Figure 7:
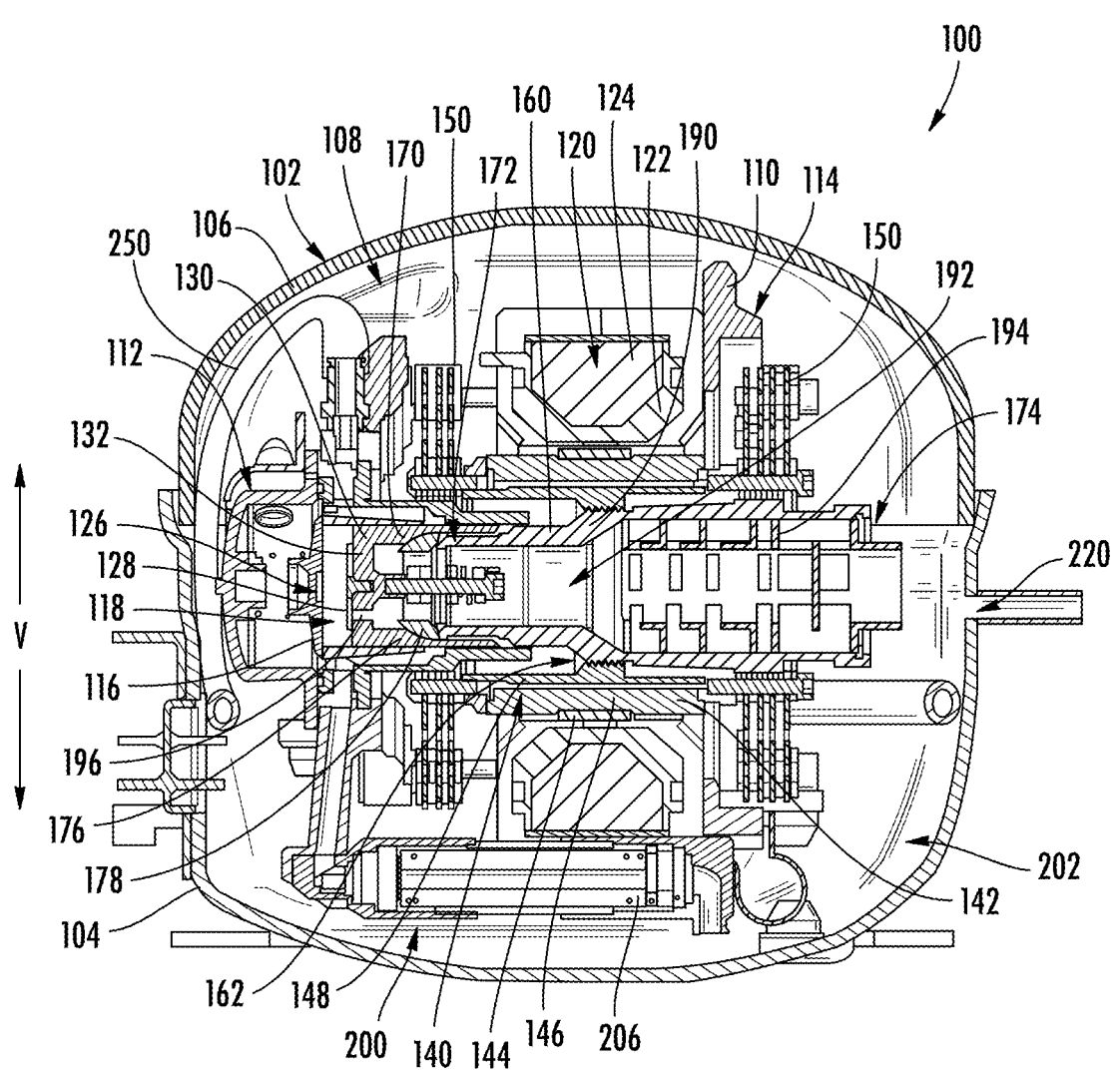
FIG. 7 depicts a section view of the exemplary linear compressor of FIG. 3 with the piston in a retracted position according to an embodiment of the present subject matter.

Referring now generally to FIGS. 3 through 7, a linear compressor 100 is described according to exemplary embodiments of the present subject matter. Specifically, FIGS. 3 and 4 provide perspective, section views of the linear compressor 100, FIG. 5 provides a perspective view of the linear compressor 100 with a compressor shell or housing 102 removed for clarity, and FIGS. 6 and 7 provide section views of the linear compressor when a piston thereof is in extended and retracted positions, respectively. It should be appreciated that the linear compressor 100 is used herein only as an exemplary embodiment to facilitate the descrip-tion of aspects of the present subject matter. Modifications and variations may be made to the linear compressor 100 while remaining within the scope of the present subject matter.

As illustrated for example in FIGS. 3 and 4, the housing 102 may include a lower portion or lower housing 104 and an upper portion or upper housing 106 which are joined together to form a substantially enclosed cavity 108 for housing various components of linear compressor 100. Specifically, for example, cavity 108 may be a hermetic or air-tight shell that can house working components of linear compressor 100 and may hinder or prevent refrigerant from leaking or escaping from refrigeration system 60. In addition, linear compressor 100 generally defines an axial direction A, a radial direction R, and a circumferential direction C. It should be appreciated that linear compressor 100 is described and illustrated herein only to describe aspects of the present subject matter. Variations and modifications to linear compressor 100 may be made while remaining within the scope of the present subject matter.

Referring particularly to FIGS. 3 through 7, various parts and working components of the linear compressor 100 will be described according to an exemplary embodiment. As shown, the linear compressor 100 includes a casing 110 that extends between a first end portion 112 and a second end portion 114, e.g., along the axial direction A. The casing 110 includes a cylinder 117 that defines a compressor chamber 118. The cylinder 117 is positioned at or adjacent first end portion 112 of casing 110. The chamber 118 extends longitudinally along the axial direction A. As discussed in greater detail below, the linear compressor 100 is operable to increase a pressure of fluid within chamber 118 of linear compressor 100. Further, the linear compressor 100 may be used to compress any suitable fluid, such as refrigerant or air. In particular, the linear compressor 100 may be used in a refrigerator appliance, such as refrigerator appliance 10 (FIG. 1) in which the linear compressor 100 may be used as compressor 64 (FIG. 2).

Moreover, as shown, the linear compressor 100 includes a stator 120 of a motor that is mounted or secured to casing 110. For example, stator 120 generally includes an outer back iron 122 and a driving coil 124 that extend about the circumferential direction C within casing 110. The linear compressor 100 also includes one or more valves that permit refrigerant to enter and exit chamber 118 during operation of linear compressor 100. For example, a discharge muffler 126 is positioned at an end of chamber 118 for regulating the flow of refrigerant out of chamber 118, while a suction valve 128 (shown only in FIGS. 6-7 for clarity) regulates flow of refrigerant into chamber 118.

A piston 130 with a piston head 132 is slidably received within chamber 118 of cylinder 117. The piston 130 can be operably coupled to the motor. In particular, piston 130 is movable along the axial direction A. For instance, the piston 130 can be movable in a negative axial direction A toward the chamber 118. The piston 130 can be movable in a positive axial direction A away from the chamber 118. During sliding of piston head 132 within chamber 118, piston head 132 compresses refrigerant within chamber 118. As an example, from a top dead center position (see, e.g., FIG. 6), piston head 132 can slide within chamber 118 towards a bottom dead center position (see, e.g., FIG. 7) along the axial direction A, i.e., an expansion stroke of piston head 132. When piston head 132 reaches the bottom dead center position, piston head 132 changes directions and slides in chamber 118 back towards the top dead center position, i.e., a compression stroke of piston head 132. It should be understood that the linear compressor 100 may include an additional piston head and/or additional chambers at an opposite end of linear compressor 100. Thus, linear compressor 100 may have multiple piston heads in alternative exemplary embodiments.

As illustrated, the linear compressor 100 also includes a mover 140 which is generally driven by stator 120 for compressing refrigerant. Specifically, for example, mover 140 may include an inner back iron 142 positioned in stator 120 of the motor. In particular, outer back iron 122 and/or driving coil 124 may extend about inner back iron 142, e.g., along the circumferential direction C. Inner back iron 142 also has an outer surface that faces towards outer back iron 122 and/or driving coil 124. At least one driving magnet 144 is mounted to inner back iron 142, e.g., at the outer surface of inner back iron 142.

Driving magnet 144 may face and/or be exposed to driving coil 124. In particular, driving magnet 144 may be spaced apart from driving coil 124, e.g., along the radial direction R by an air gap. Thus, the air gap may be defined between opposing surfaces of driving magnet 144 and driving coil 124. Driving magnet 144 may also be mounted or fixed to inner back iron 142 such that an outer surface of driving magnet 144 is substantially flush with the outer surface of inner back iron 142. Thus, driving magnet 144 may be inset within inner back iron 142. In such a manner, the magnetic field from driving coil 124 may have to pass through only a single air gap between outer back iron 122 and inner back iron 142 during operation of the linear compressor 100, and the linear compressor 100 may be more efficient relative to linear compressors with air gaps on both sides of a driving magnet.

As may be seen in FIG. 3, the driving coil 124 extends about inner back iron 142, e.g., along the circumferential direction C. In alternative example embodiments, inner back iron 142 may extend around driving coil 124 along the circumferential direction C. The driving coil 124 is operable to move the inner back iron 142 along the axial direction A during operation of driving coil 124. As an example, a current may be induced within driving coil 124 by a current source (not shown) to generate a magnetic field that engages driving magnet 144 and urges piston 130 to move along the axial direction A in order to compress refrigerant within chamber 118 as described above and will be understood by those skilled in the art. In particular, the magnetic field of driving coil 124 may engage driving magnet 144 in order to move inner back iron 142 and piston head 132 along the axial direction A during operation of driving coil 124. Thus, the driving coil 124 may slide the piston 130 between the top dead center position and the bottom dead center position, e.g., by moving inner back iron 142 along the axial direction A, during operation of driving coil 124.

Figure 8:
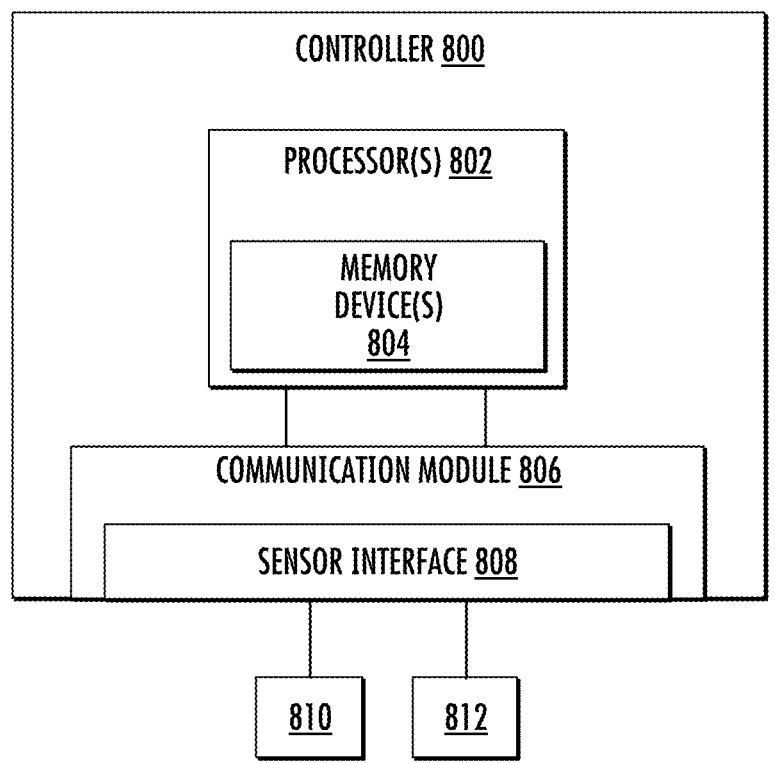
FIG. 8 depicts a block diagram of one embodiment of a controller of a refrigerator appliance according to example embodiments of the present disclosure.

Referring particularly to FIG. 8, operation of the refrigerator appliance 10 may generally be controlled by a processing device or controller 800. The controller 800 may, for example, be operatively coupled to the control panel 24 for user manipulation to select features and operations of the refrigerator appliance 10, such as temperature set points. Thus, the controller 800 can operate various components of the refrigerator appliance 10 to execute selected system cycles, processes, and/or features. In exemplary embodiments, the controller 800 is in operative communication (e.g., electrical or wireless communication) with each of the chambers or compartments therein, for example, to regulate temperature as described herein.

More specifically, as shown in FIG. 8, a block diagram of one embodiment of suitable components that may be included within the controller 800 in accordance with example aspects of the present disclosure is illustrated. As shown, the controller 800 may include one or more processor(s) 802, computer, or other suitable processing unit and associated memory device(s) 804 that may include suitable computer-readable instructions that, when implemented, configure the controller to perform various different functions, such as receiving, transmitting and/or executing signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 804 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. The memory can be a separate component from the processor or can be included onboard within the processor.

Such memory device(s) 804 may generally be configured to store suitable computer-readable instructions that, when implemented by the processor(s) 802, configure the controller to perform various functions as described herein. In particular, the processor(s) 802 can include microprocessors, CPUs or the like, such as general or special purpose microprocessors operable to execute programming instructions or micro-control code associated with operation of the linear compressor 100. Additionally, the controller 800 may also include a communications module 806 to facilitate communications between the controller and the various components of the refrigerator appliance 10. An interface can include one or more circuits, terminals, pins, contacts, conductors, or other components for sending and receiving control signals. Moreover, the controller 800 may include a sensor interface 808 (e.g., one or more analog-to-digital converters) to permit signals transmitted from the temperature probe(s) 810 to be converted into signals that can be understood and processed by the processor(s) 802. The controller 800 may furthermore optionally receive a second temperature signal(s) from the thermistor(s) 812 configured to generate one or more second temperature signals representative of the actual temperature of the item or the chamber.

Alternatively, the controller 800 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The inner back iron 142 further includes an outer cylinder 146 and an inner sleeve 148. The outer cylinder 146 defines the outer surface of inner back iron 142 and also has an inner surface positioned opposite the outer surface of outer cylinder 146. The inner sleeve 148 is positioned on or at inner surface of outer cylinder 146. A first interference fit between outer cylinder 146 and inner sleeve 148 may couple or secure outer cylinder 146 and inner sleeve 148 together. In alternative exemplary embodiments, inner sleeve 148 may be welded, glued, fastened, or connected via any other suitable mechanism or method to outer cylinder 146.

The outer cylinder 146 may be constructed of or with any suitable material. For example, outer cylinder 146 may be constructed of or with a plurality of (e.g., ferromagnetic) laminations. The laminations are distributed along the circumferential direction C in order to form outer cylinder 146 and are mounted to one another or secured together, e.g., with rings pressed onto ends of the laminations. The outer cylinder 146 may define a recess that extends inwardly from the outer surface of outer cylinder 146, e.g., along the radial direction R. The driving magnet 144 is positioned in the recess on outer cylinder 146, e.g., such that the driving magnet 144 is inset within outer cylinder 146.

The linear compressor 100 also includes a plurality of planar springs 150. Each planar spring 150 may be coupled to a respective end of inner back iron 142, e.g., along the axial direction A. During operation of driving coil 124, planar springs 150 support inner back iron 142. In particular, the inner back iron 142 is suspended by planar springs 150 within the stator or the motor of the linear compressor 100 such that motion of inner back iron 142 along the radial direction R is hindered or limited while motion along the axial direction A is relatively unimpeded. Thus, the planar springs 150 may be substantially stiffer along the radial direction R than along the axial direction A. In such a manner, planar springs 150 can assist with maintaining a uniformity of the air gap between driving magnet 144 and driving coil 124, e.g., along the radial direction R, during operation of the motor and movement of inner back iron 142 on the axial direction A. The planar springs 150 can also assist with hindering side pull forces of the motor from transmitting to piston 130 and being reacted in cylinder 117 as a friction loss.

A flex mount 160 is mounted to and extends through inner back iron 142. In particular, the flex mount 160 is mounted to inner back iron 142 via inner sleeve 148. Thus, the flex mount 160 may be coupled (e.g., threaded) to inner sleeve 148 at the middle portion of inner sleeve 148 and/or flex mount 160 in order to mount or fix flex mount 160 to inner sleeve 148. The flex mount 160 may assist with forming a coupling 162. The coupling 162 connects inner back iron 142 and piston 130 such that motion of inner back iron 142, e.g., along the axial direction A, is transferred to piston 130.

The coupling 162 may be a compliant coupling that is compliant or flexible along the radial direction R. In particular, coupling 162 may be sufficiently compliant along the radial direction R such that little or no motion of inner back iron 142 along the radial direction R is transferred to piston 130 by coupling 162. In such a manner, side pull forces of the motor are decoupled from piston 130 and/or cylinder 117 and friction between piston 130 and cylinder 117 may be reduced.

As may be seen in the figures, the piston head 132 of piston 130 has a piston cylindrical side wall 170. The cylindrical side wall 170 may extend along the axial direction A from piston head 132 towards inner back iron 142. An outer surface of cylindrical side wall 170 may slide on cylinder 117 at chamber 118 and an inner surface of cylindrical side wall 170 may be positioned opposite the outer surface of cylindrical side wall 170. Thus, the outer surface of cylindrical side wall 170 may face away from a center of cylindrical side wall 170 along the radial direction R, and the inner surface of cylindrical side wall 170 may face towards the center of cylindrical side wall 170 along the radial direction R.

The flex mount 160 extends between a first end portion 172 and a second end portion 174, e.g., along the axial direction A. According to an exemplary embodiment, the inner surface of cylindrical side wall 170 defines a ball seat 176 proximate first end portion. In addition, coupling 162 also includes a ball nose 178. Specifically, for example, the ball nose 178 is positioned at first end portion 172 of flex mount 160, and ball nose 178 may contact flex mount 160 at first end portion 172 of flex mount 160. In addition, ball nose 178 may contact piston 130 at ball seat 176 of piston 130. In particular, ball nose 178 may rest on ball seat 176 of piston 130 such that ball nose 178 is slidable and/or rotatable on ball seat 176 of piston 130. For example, ball nose 178 may have a frusto-spherical surface positioned against ball seat 176 of piston 130, and ball seat 176 may be shaped complementary to the frusto-spherical surface of ball nose 178. The frusto-spherical surface of ball nose 178 may slide and/or rotate on ball seat 176 of piston 130.

Relative motion between the flex mount 160 and the piston 130 at the interface between ball nose 178 and ball seat 176 of piston 130 may provide reduced friction between piston 130 and cylinder 117, e.g., compared to a fixed connection between flex mount 160 and piston 130. For example, when an axis on which piston 130 slides within cylinder 117 is angled relative to the axis on which inner back iron 142 reciprocates, the frusto-spherical surface of ball nose 178 may slide on ball seat 176 of piston 130 to reduce friction between piston 130 and cylinder 117 relative to a rigid connection between inner back iron 142 and piston 130.

Further, as shown, the flex mount 160 is connected to the inner back iron 142 away from first end portion 172 of flex mount 160. For example, flex mount 160 may be connected to inner back iron 142 at second end portion 174 of flex mount 160 or between first and second end portions 172, 174 of flex mount 160. Conversely, the flex mount 160 is positioned at or within piston 130 at first end portion 172 of flex mount 160, as discussed in greater detail below.

In addition, the flex mount 160 includes a tubular wall 190 between inner back iron 142 and piston 130. A channel 192 within tubular wall 190 is configured for directing compressible fluid, such as refrigerant or air, though flex mount 160 towards piston head 132 and/or into piston 130. Inner back iron 142 may be mounted to flex mount 160 such that inner back iron 142 extends around tubular wall 190, e.g., at the middle portion of flex mount 160 between first and second end portions 172, 174 of flex mount 160. Channel 192 may extend between first and second end portions 172, 174 of flex mount 160 within tubular wall 190 such that the compressible fluid is flowable from first end portion 172 of flex mount 160 to second end portion 174 of flex mount 160 through channel 192. In such a manner, compressible fluid may flow through inner back iron 142 within flex mount 160 during operation of the linear compressor 100. A muffler 194 may be positioned within channel 192 within tubular wall 190, e.g., to reduce the noise of compressible fluid flowing through channel 192.

The piston head 132 also defines at least one opening 196. Opening 196 of piston head 132 extends, e.g., along the axial direction A, through piston head 132. Thus, the flow of fluid may pass through piston head 132 via opening 196 of piston head 132 into chamber 118 during operation of the linear compressor 100. In such a manner, the flow of fluid (that is compressed by piston head 132 within chamber 118) may flow within channel 192 through flex mount 160 and inner back iron 142 to piston 130 during operation of the linear compressor 100. As explained above, suction valve 128 (FIGS. 6-7) may be positioned on piston head 132 to regulate the flow of compressible fluid through opening 196 into chamber 118.

Referring still to FIGS. 3 through 7, the linear compressor 100 may also include a lubrication system 200 for circulating a lubricant, e.g., such as oil, through the working or moving components of the linear compressor 100 to reduce friction, improve efficiency, etc. For example, as shown, the housing 102 may generally defines a sump 202 which is configured for collecting oil. Specifically, the sump 202 may be defined in the bottom portion of lower housing 104. The lubrication system 200 further includes a pump 206 for continuously circulating oil through components of the linear compressor 100 which need lubrication.

As also illustrated in the figures, the linear compressor 100 may include a suction inlet 220 for receiving a flow of refrigerant. Specifically, as shown, the suction inlet 220 may be defined on the housing 102 (e.g., such as on lower housing 104), and may be configured for receiving a refrigerant supply conduit to provide refrigerant to the cavity 108. As explained above, the flex mount 160 includes tubular wall 190, which defines channel 192 for directing compressible fluid, such as refrigerant gas, through flex mount 160 towards piston head 132. In this manner, desirable flow path of refrigerant gas is through suction inlet 220, through channel 192, through opening 196, and into chamber 118. Suction valve 128 may block opening 196 during a compression stroke and a discharge valve 116 may permit the compressed gas to exit chamber 118 when the desired pressure is reached.

FIG. 9 depicts a flow diagram of an example method 900 for operating a linear compressor of an appliance according to example embodiments of the present disclosure. More particularly, the method 900 can be implemented to control a linear compressor of a refrigerator appliance (e.g., as depicted in FIGS. 1-2). FIG. 9 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure. Additionally, method 900 is generally discussed with reference to the refrigerator appliance 10 described above with reference to FIGS. 1-2 and the linear compressor 100 described above with reference to FIGS. 3-8. However, it should be understood that aspects of the present method 900 can find application with any suitable appliance and/or linear compressor.

Figure 10:
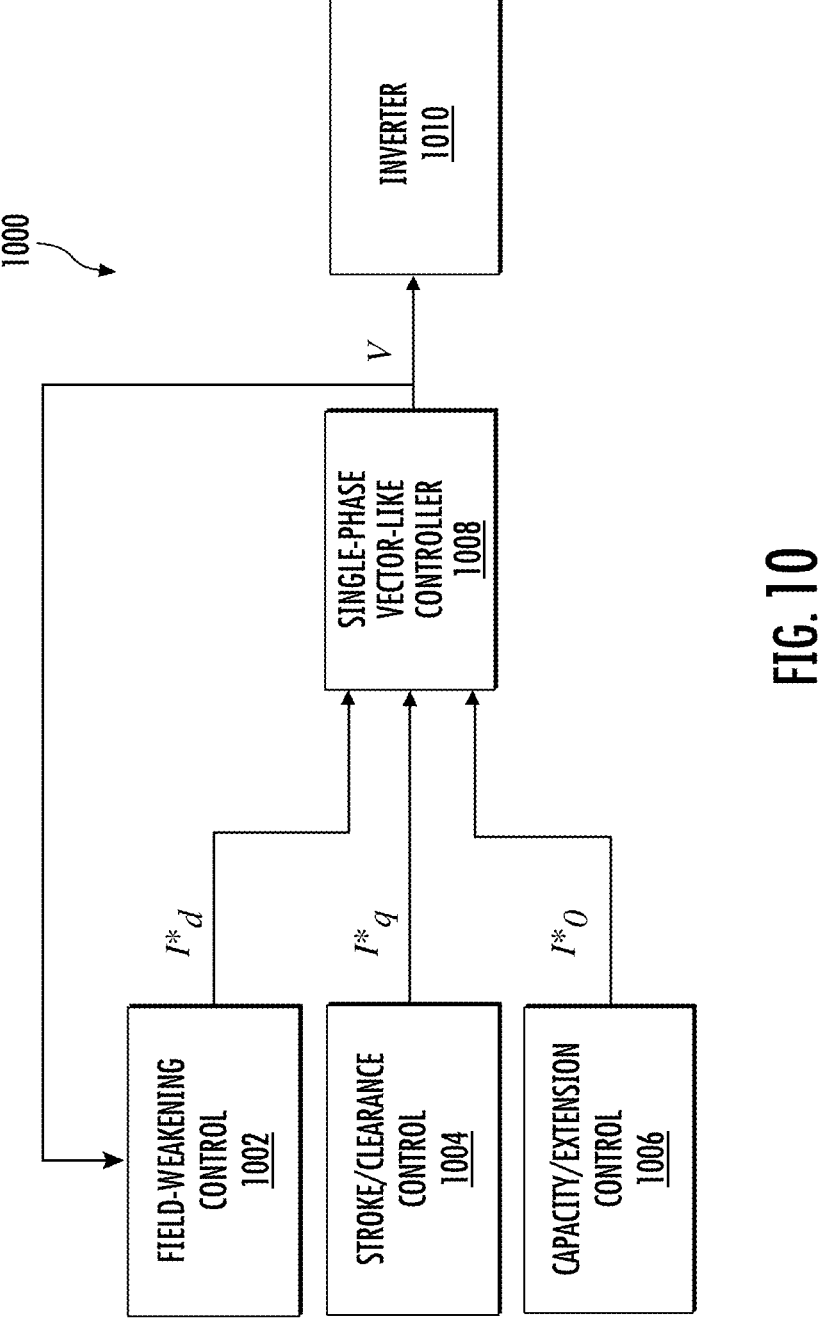
FIG. 10 depicts an example control scheme operable to control a linear compressor according to example embodiments of the present disclosure.

As noted above, the method 900 provides a method for operating a linear compressor (e.g., linear compressor 100) of an appliance (e.g., refrigerator appliance 10). The method 900 can include, at (902), operating a motor of the linear compressor in order to drive a rotor of the motor. In some embodiments, the linear compressor can include a single-phase motor such as, e.g., a single-phase linear motor. More particularly, a controller can be configured to implement a control scheme (e.g., control scheme 1000, 1200) to operate a motor of the linear compressor (e.g., linear compressor 100) in order to drive a rotor (e.g., rotor coupled to piston 130) of the motor. In some embodiments, the controller can be configured to implement a single-phase vector-like control scheme 1000 (e.g., as depicted in FIGS. 10-11C). In other embodiments, the controller can be configured to implement a single-phase phasor-like control scheme 1200 (e.g., as depicted in FIG. 12).

The method 900 can include, at (904), obtaining one or more feedback measurements (e.g., current feedback, voltage feedback, etc.) of one or more electrical characteristics (e.g., current, voltage, magnetic flux, etc.) of the motor. More particularly, the controller can be configured to receive a voltage feedback measurement of the motor. For instance, the control scheme (e.g., control scheme 1000, 1200) can include a current controller configured to output a target voltage for controlling the motor. The current controller can be further configured to provide the target voltage to the controller as the voltage feedback measurement, as will be described in further detail below in regards to FIGS. 10-12C.

In some embodiments, the control scheme 1000, 1200 can include a sensored feedback system (not shown) configured to obtain the one or more feedback measurements. For instance, in some embodiments, the control scheme 1000, 1200 can include a sensor (e.g., encoder, Hall effect sensor, etc.) configured to obtain a velocity signal and a phase-locked loop (PLL) configured to extract the frequency and phase from the velocity signal.

In other embodiments, the control scheme 1000, 1200 can include a sensorless feedback system (not shown) configured to obtain the one or more feedback measurements. As used herein, a "sensorless" feedback system can refer to any feedback system operable to determine data indicative of a position or a speed of the motor without a position sensor or a speed sensor. For instance, in some embodiments, the control scheme 1000, 1200 can include, e.g., an observer (not shown) configured to estimate back-EMF and/or velocity based, at least in part, on voltage and/or current signals of the motor. The back-EMF signal and/or the velocity signal can then be fed into a PLL (as described above) to extract the frequency and phase of the corresponding signal.

Referring still to FIG. 9, the method 900 can include, at (906), adjusting a control setpoint for the motor based on the voltage feedback measurement and a voltage threshold ($V_{dc}$). More particularly, the controller can be configured to compare the voltage feedback measurement to the voltage threshold ($V_{dc}$). When the voltage feedback measurement is greater than or equal to the voltage threshold ($V_{dc}$), the controller can be configured to set the control setpoint to a negative value. When the voltage feedback measurement is less than to the voltage threshold ($V_{dc}$), the controller can be configured to set the control setpoint to zero.

The voltage threshold ($V_{dc}$) may be determined based on a DC bus voltage of the inverter 1010. In some embodiments, the voltage threshold ($V_{dc}$) may be a maximum DC bus voltage of the inverter 1010. In other embodiments, the voltage threshold ($V_{dc}$) may be a percentage of the maximum DC bus voltage of the inverter 1010. For instance, the voltage threshold ($V_{dc}$) may be set to ninety percent (90%), ninety-five percent (95%), ninety-eight percent (98%) or any other suitable percentage of the maximum DC bus voltage. Those of ordinary skill in the art will understand that the voltage threshold ($V_{dc}$) can be set in any suitable manner without deviating from the scope of the present disclosure.

The method 900 can include, at (908), controlling the motor of the linear compressor based, at least in part, on the control setpoint adjusted at (906) so as to implement a flux weakening operation when the voltage feedback measurement is greater than or equal to the voltage threshold. Setting the control setpoint to the negative value implements a flux weakening operation (which can manipulate a driving frequency) by causing a difference between a phase of the motor current and a phase of the velocity. In particular, the phase of the motor current leads the phase of the velocity. The flux weakening operation reduces the amount of the requisite voltage (V) required to drive the motor to achieve a particular stroke by generating a stator flux in a stator of the motor which opposes (e.g., weakens) a rotor flux of a rotor of the motor. As such, adjusting the control setpoint to implement the flux weakening operation can allow the motor to be driven at longer strokes than the voltage capabilities of the motor drive would otherwise allow.

Figure 11A:
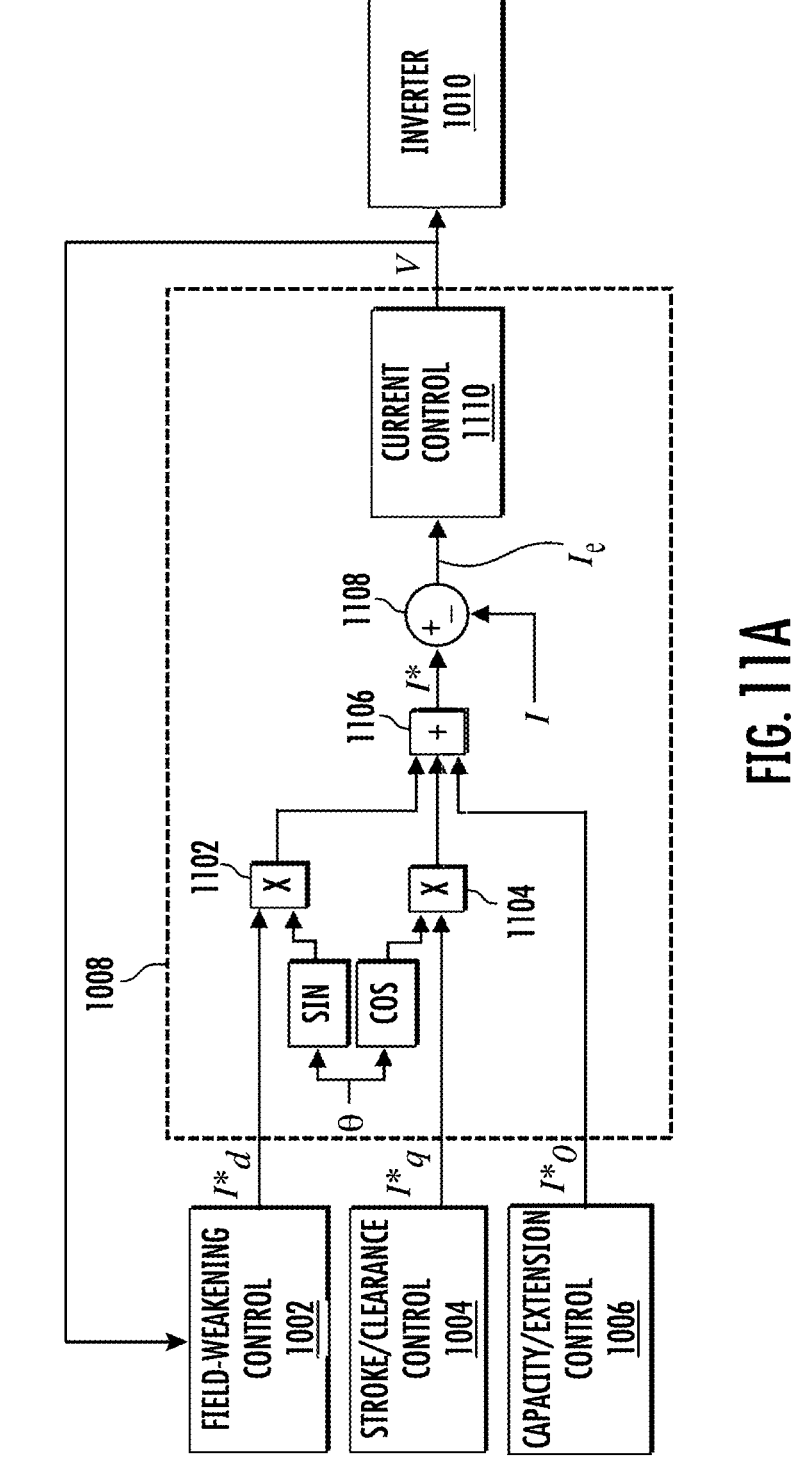
FIG. 11A depicts an example single-phase vector-like control scheme implemented by the controller of FIG. 10 according to example embodiments of the present disclosure.
Figure 11B:
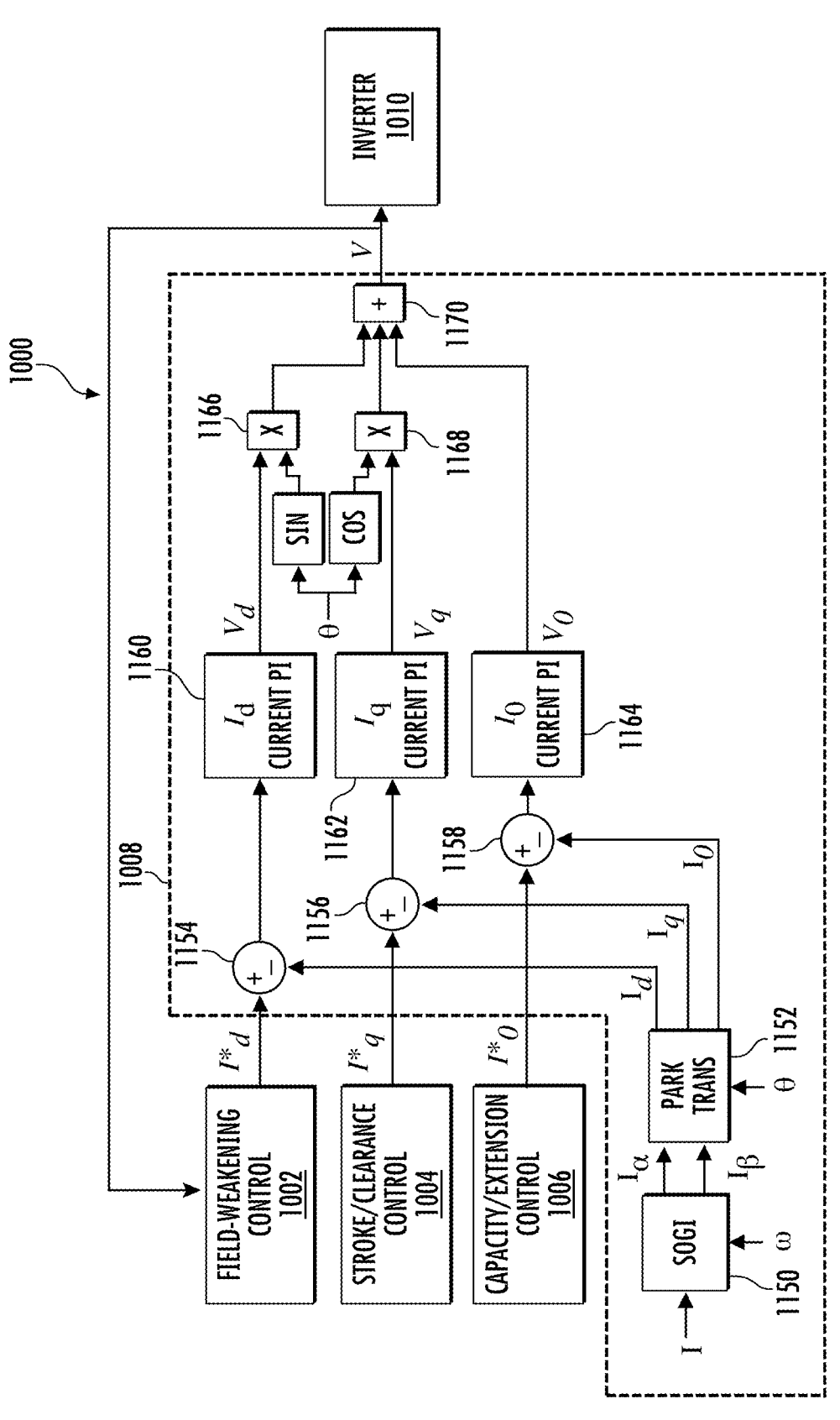
FIG. 11B depicts an example single-phase vector-like control scheme implemented by the controller of FIG. 10 according to example embodiments of the present disclosure.
Figure 11C:
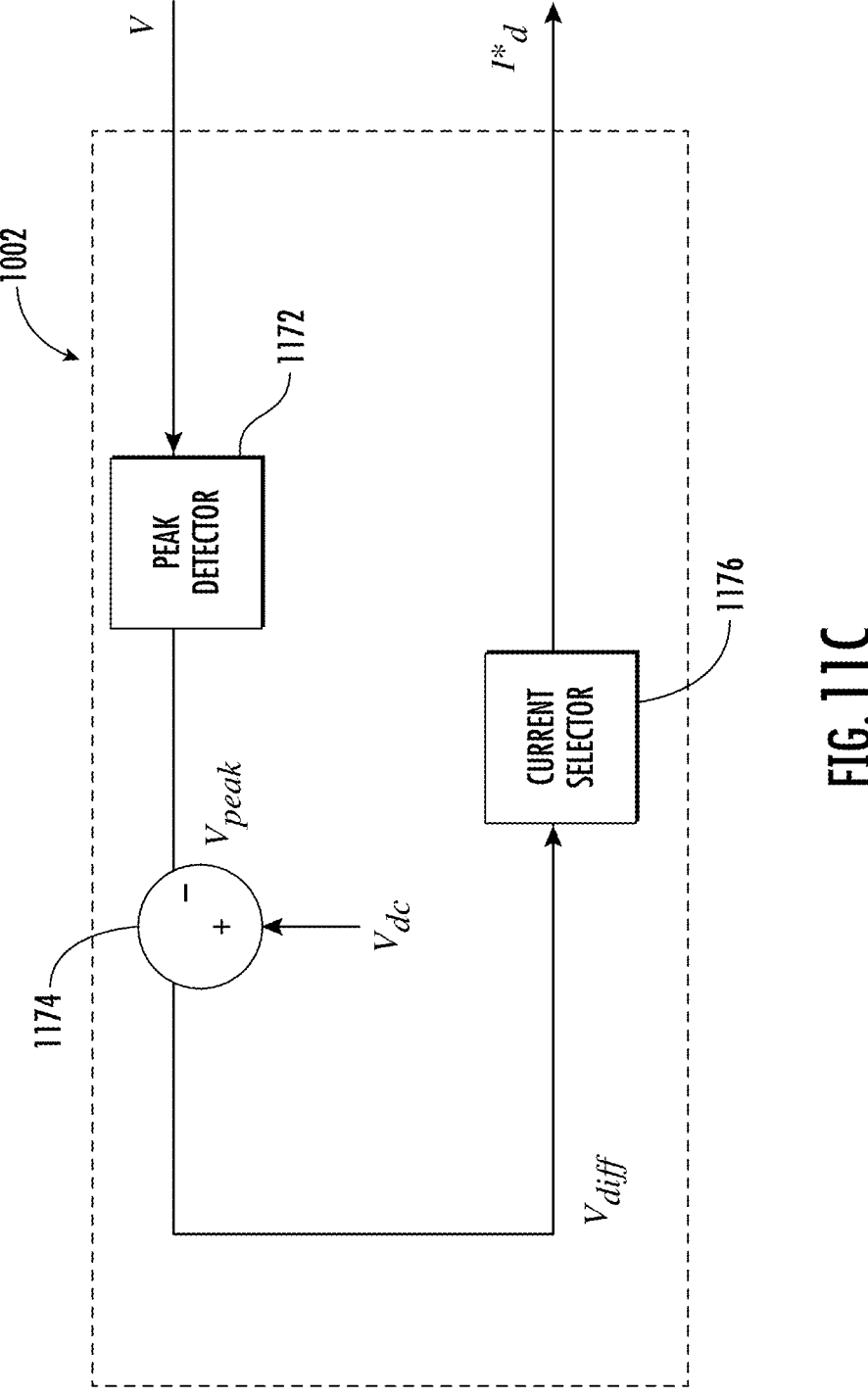
FIG. 11C depicts an example flux weakening controller implemented by the controller of FIG. 10 according to example embodiments of the present disclosure.
Figure 12:
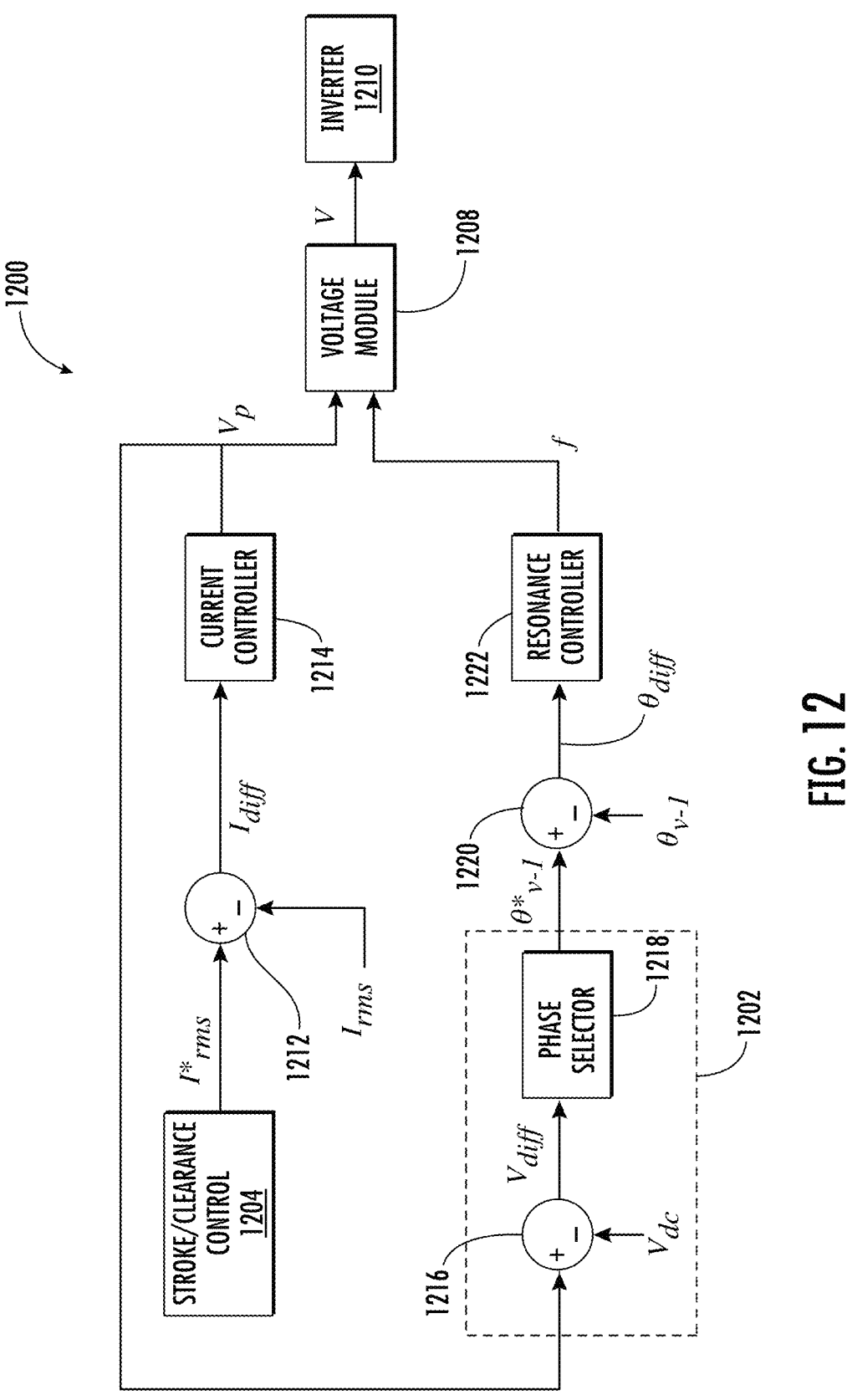
FIG. 12 depicts an example control scheme operable to control a linear compressor according to other example embodiments of the present disclosure.

The method of FIG. 9 can be better understood with reference to FIGS. 10-12. In particular, FIG. 10 depicts an example control scheme operable to control a linear compressor (e.g., linear compressor 100) of an appliance (e.g., refrigerator appliance 10) according to example embodiments of the present disclosure. FIG. 11A depicts an example embodiment of a single-phase vector-like controller 1008 implementing single-phase tracking control. FIG.

11B depicts an example embodiment of the single-phase vector-like controller 1008 implementing single-phase DQ0 control. FIG. 11C depicts an example flux weakening controller 1002 implemented by the controller of FIG. 10 according to example embodiments of the present disclosure. FIG. 12 an example control scheme operable to control a linear compressor (e.g., linear compressor 100) of an appliance (e.g., refrigerator appliance 10) according to other example embodiments of the present disclosure.

As shown in the embodiment illustrated in FIG. 10, a controller can be operably coupled to the motor of the linear compressor and can be configured to implement a single-phase vector-like control scheme (e.g., control scheme 1000) to operate a motor of the linear compressor in order to drive a rotor (e.g., rotor coupled to piston 130) of the motor. More particularly, the control scheme 1000 can include a flux weakening controller 1002, a stroke controller 1004 (e.g., clearance controller 1004), and a capacity controller 1006 (e.g., extension controller 1006). As discussed in more detail below, the flux weakening controller 1002 can be configured to control a d-axis current component of the motor, the stroke controller 1004 (e.g., clearance controller 1004) can be configured to control a q-axis current component of the motor, and the capacity controller 1006 (e.g., extension controller 1006) can be configured to control a DC current component of the motor. Furthermore, as will be discussed in more detail below with reference to FIGS. 11A-11B, the control scheme 1000 can further include a single-phase vector-like controller 1008. The single-phase vector-like controller 1008 can be operatively coupled to the flux weakening controller 1002, the stroke controller 1004, and the capacity controller 1006. The control scheme 1000 can further include an inverter 1010 configured to supply a variable frequency waveform to the motor. Furthermore, as will be discussed in greater detail below, the single-phase vector-like controller 1008 can be configured to determine the requisite voltage needed by the inverter 1010 in order to drive the motor based, at least in part, on the d-axis current component output by the flux weakening controller 1002, the q-axis current component output by the stroke controller 1004, and the DC current component output by the capacity controller 1006.

As noted above, in some embodiments, the motor can be a single-phase linear motor. The single-phase linear motor can have a stator and a rotor. The rotor can be operatively coupled to a piston (e.g., a reciprocating piston) that compresses gas when operated. In some embodiments, the piston can be fitted with springs in order to allow resonant oscillation to facilitate the compression by the piston.

A total magnetic flux ($\lambda$) produced by the motor includes a rotor component ($\lambda_r$) and a stator component ($\lambda_s$). When the rotor is centered in the stator (i.e., x=0), total rotor flux ($\lambda_r$) linked to the stator is zero. When the rotor moves forward and/or backward from the center of the stator, the rotor flux ($\lambda_r$) increases and decreases, respectively, in a linear manner. Moreover, windings of the stator produce a stator flux proportional to a winding current in the stator winding (I) by the inductance (L). More particularly, the total flux ($\lambda$) is given by:

$$\lambda_r \approx \alpha x$$

$$\lambda_s = LI$$

$$\lambda = \lambda_s + \lambda_r = LI + \alpha x$$

When the total flux ($\lambda$) changes, an electromotive force voltage (EMF) is produced in the motor. More particularly, the EMF ($\varepsilon$) is given by:

$$\varepsilon = \dot{\lambda} = L\dot{I} + \alpha\dot{x}$$

where $\dot{\lambda}$ is a time derivative of the total flux, $\dot{I}$ is a time derivative of the stator winding current, $\dot{x}$ is a time derivative of the rotor position, and $\alpha$ is a motor constant. Furthermore, $\alpha\dot{x}$ represents a back-EMF voltage (back-EMF) of the motor.

Taking into account the above-mentioned equation for the total EMF, a total voltage (V) for the motor is given by:

$$V = RI + L\dot{I} + \alpha\dot{x}$$

where R is a resistance of the stator windings.

As noted above, in some embodiments, the piston can be fitted with springs to allow the resonant oscillation to facilitate the compression by the piston. More particularly, the piston oscillates in an approximately sinusoidal manner. The sinusoidal oscillation of the piston is given by:

$$x(t) = x_1 \sin\theta + x_0$$

where $\theta$ represents a piston displacement phase angle, $x_1$ represents an amplitude of the piston displacement, and $x_0$ represents a midpoint of the piston displacement. Those of ordinary skill in the art will understand that the asymmetric force of gas compression can induce a positive offset in the position of the sine waveform.

Taking the above-equation, the time derivative of the rotor position (for use in the total motor voltage equation) can be derived. More particularly, the time derivative of the rotor position is given by:

$$\dot{x}(t) = \omega x_1 \cos\theta$$

where $\omega = \dot{\theta}$. As used herein, "velocity equation" refers to the above-described equation.

Referring still the FIG. 10, the control scheme 1000 can be configured to control the amplitude of the motor current (I) and the relative phase between the motor current (I) and the back-EMF. Those of ordinary skill in the art will understand that current which is in-phase with the back-EMF generates a net force which increases stroke and capacity of the linear compressor. Likewise, those of ordinary skill in the art will understand that current which is out-of-phase with the back-EMF does not generate a net force but does affect the total voltage (V) needed by the inverter (e.g., inverter 1010) to drive the motor. In this way, the out-of-phase current can be useful for flux weakening operations.

The piston displacement phase angle ($\theta$) can be used to define an in-phase component and an out-of-phase component of the sinusoidal motor current (I). The total motor current (I) and its time derivative ($\dot{I}$) are given by:

$$I(t) = I_d \sin\theta + I_q \cos\theta + I_0$$

$$\dot{I}(t) = \dot{I}_d \sin\theta + \omega I_d \cos\theta + \dot{I}_q \cos\theta - \omega I_q \sin\theta + \dot{I}_0$$

where $I_d$ is the amplitude of the current component that is out-of-phase with the back-EMF (i.e., in-phase with the rotor flux), $I_q$ is the amplitude of the current component that is in-phase with the back-EMF (i.e., out-of-phase with the rotor flux), and $I_0$ is the amplitude of the DC current.

Thus, substituting I(t), $\dot{I}$(t), and $\dot{x}$(t) into the total voltage (V) for the motor can be represented:

$$V = (RI_d + L\dot{I}_d - L\omega I_q)\sin\theta + (RI_q + L\dot{I}_q + L\omega I_d + \alpha\omega x_1)\cos\theta + RI_0 + L\dot{I}_0$$

$$V = V_d \sin\theta + V_q \cos\theta + V_0$$

where $V_d$ is the amplitude of the voltage component that is out-of-phase with the back-EMF (i.e., in-phase with the rotor flux), $V_q$ is the amplitude of the voltage component that is in-phase with the back-EMF (i.e., out-of-phase with the rotor flux), and $V_0$ is the amplitude of the DC voltage.

As such, in the dq frame, the electrical dynamics of the stator windings can be given by:

$$\begin{bmatrix} V_d \\ V_q \\ V_0 \end{bmatrix} = \begin{bmatrix} (sL+R) & -L\omega & 0 \\ L\omega & (sL+R) & 0 \\ 0 & 0 & (sL+R) \end{bmatrix} \begin{bmatrix} I_d \\ I_q \\ I_0 \end{bmatrix} + \begin{bmatrix} 0 \\ \alpha\omega x_1 \\ 0 \end{bmatrix}$$

where s is a Laplace variable. Those of ordinary skill in the art will understand that the above-described equations directly parallel the dq voltage equations for a three-phase permanent magnet synchronous motor (PMSM). In this way, the present disclosure provides a single-phase vector-like control scheme that is analogous to a field-oriented control scheme commonly used in three-phase motors such as, e.g., PMSMs and brushless DC (BLDC) motors.

The control scheme 1000 can include a flux weakening controller 1002 configured to control the d-axis current component of the motor current, a stroke controller 1004 (e.g., clearance controller 1004) configured to control the q-axis current component of the motor current, and a capacity controller 1006 (e.g., extension controller 1006) configured to control the DC current component of the motor current. More particularly, the flux weakening controller 1002 can be configured to determine a target d-axis current component $$I_d^*$$

the stroke controller 1004 can be configured to determine a target q-axis current component $$I_q^*$$

and the capacity controller 1006 can be configured to control a target DC current component $$I_0^*$$

The target d-axis current component $$I_d^*$$

target q-axis current component $$I_q^*$$

and target DC current component $$I_0^*$$

can then be passed to the single-phase vector-like controller 1008. As noted above, the single-phase vector-like controller

1008 can be configured to determine the requisite voltage (V) required by the inverter 1010 in order to drive the motor based, at least in part, on the target d-axis current component $$I_d^*$$

the target q-axis current component $$I_q^*$$

and the target DC current component $$I_0^*$$

Referring now to FIG. 11A, in some embodiments, the controller can be configured to implement single-phase tracking control. In such embodiments, the single-phase vector-like controller 1008 can be configured to determine a target current trajectory (I*). The target current trajectory can be based on the target d-axis current component $$I_d^*$$

from the flux weakening controller 1002, the target q-axis current component $$I_q^*$$

from the stroke controller 1004, and the target DC current component $$(I_0^*)$$

from the capacity controller 1006. The target current trajectory (I*) can also be based on a feedback measurement of a phase angle of rotor (e.g., rotor coupled to piston 130) magnetic flux obtained at (904). The control scheme 1000 can be configured to determine a total voltage (V) for the motor necessary to force the actual motor current (I(t)) to track the target current trajectory (I*) in real time.

The controller (e.g., via control scheme 1000) can be configured to adjust the target d-axis current component $$(I_d^*)$$

based, at least in part, on the voltage feedback measurement obtained at (904). For instance, as noted above with reference to FIG. 10, the flux weakening controller 1002 can be configured to control the target d-axis current component $$(I_d^*)$$

of the motor. More particularly, in some embodiments, the flux weakening controller 1002 can be configured to adjust the target d-axis current component $$(I_d^*)$$

based, at least in part, on the voltage feedback measurements obtained at (904), as will be discussed in more detail below with reference to FIG. 11C. The adjusted target d-axis current component $$(I_d^*)$$

can then be used by the single-phase vector-like controller 1008, in part, to determine the total voltage (V) required by the inverter 1010. The flux weakening controller 1002 may also receive additional feedback measurements (e.g., current feedback measurements).

The controller (e.g., via control scheme 1000) can be configured to adjust the target q-axis current component $$(I_q^*)$$

based, at least in part, on the one or more feedback measurements obtained at (904). For instance, as noted above with reference to FIG. 10, the stroke controller 1004 can be configured to control the target q-axis current component $$(I_q^*)$$

of the motor. More particularly, in some embodiments, the stroke controller 1004 can be configured to adjust the target q-axis current component $$(I_q^*)$$

based, at least in part, on the one or more feedback measurements (e.g., current feedback) obtained at (904). The adjusted target q-axis current component $$(I_q^*)$$

can then be used by the single-phase vector-like controller 1008, in part, to determine the total voltage (V) required by the inverter 1010. Those of ordinary skill in the art will understand that the target q-axis current component $$(I_q^*)$$

can be adjusted in any suitable manner without deviating from the scope of the present disclosure.

The controller (e.g., via control scheme 1000) can be configured to adjust the target DC current component $$(I_0^*).$$

For instance, as noted above with reference to FIG. 10, the capacity controller 1006 can be configured to control the target DC current component ($I^*_0$) of the motor. More particularly, in some embodiments, the capacity controller 1006 can be configured to adjust the target DC current component $$(I_0^*)$$

based, at least in part, on the one or more feedback measurements (e.g., current feedback) obtained at (904). The adjusted target DC current component $$(I_0^*)$$

can then be used by the single-phase vector-like controller 1008, in part, to determine the total voltage (V) required by the inverter 1010. Those of ordinary skill in the art will understand that the target DC current component $$(I_0^*)$$

can be adjusted in any suitable manner without deviating from the scope of the present disclosure.

Still referring to FIG. 11A, the control scheme 1000 can be configured to combine the target d-axis current component $$(I_d^*)$$

with the phase of the piston displacement ($\theta$) at 1102. The control scheme 1000 can be further configured to combine the target q-axis current component $$I_q^*$$

with the phase of the piston displacement ($\theta$) at 1104. The control scheme 1000 can be further configured to sum, at 1106, the current values determined at 1102 and 1104 with target DC current component $$I_0^*$$

Thus, the control scheme 1000 can be configured to determine the target current trajectory (I*) at 1106. The target current trajectory (I*) is given by:

$$I^* = I_d^* \sin\,\theta + I_q^* \cos\,\theta + I_0^*$$

Furthermore, the controller (e.g., via control scheme 1000) can be configured to determine a trajectory difference ($I_e$) (e.g., a trajectory error) between the target current trajectory (I*) and the current feedback measurements (I) (e.g., obtained at (904)). As noted above with reference to FIG. 10, the current feedback measurements (I) can be obtained by a sensored feedback system or a sensorless feedback system without deviating from the scope of the present disclosure.

Responsive to determining the trajectory difference ($I_e$), the controller (e.g., via control scheme 1000) can be configured to adjust the total voltage (V) based, at least in part, on the trajectory difference ($I_e$). For instance, referring to FIG. 11A, the control scheme 1000 can include a current controller 1110 configured to adjust the total voltage (V) based, at least in part, on the trajectory difference ($I_e$). The total voltage (V) can then be sent to the inverter 1010. The total voltage (V) can also be sent to the flux weakening controller 1002.

Referring now to FIG. 11B, in other embodiments, the controller can be configured to implement single-phase DQ0 control. In such embodiments, the single-phase vector-like controller 1008 can be configured to determine an actual d-axis current component ($I_d$), an actual q-axis current component ($I_q$), and an actual DC current component ($I_0$) based, at least in part, on the current feedback measurements (I) obtained at (904). The control scheme 1000 can then use the actual d-axis current component ($I_d$), the actual q-axis current component ($I_q$), and the actual DC current component ($I_0$) to determine the total voltage (V) for the motor.

The controller (e.g., via control scheme 1000) can be configured to adjust the target d-axis current component $$I_d^*$$

based, at least in part, on the voltage feedback measurement obtained at (904), as will be discussed in more detail below with reference to FIG. 11C. The flux weakening controller 1002 may also receive additional feedback measurements (e.g., current feedback measurements). Further, the controller (e.g., via control scheme 1000) can be configured to adjust the target q-axis current component $$I_q^*$$

based, at least in part, on the one or more feedback measurements obtained at (904). Furthermore, the controller (e.g., via control scheme 1000) can be configured to adjust the target DC current component $$I_0^*$$

21 based, at least in part, on the one or more feedback measurements obtained at (904).

The control scheme 1000 can be configured to obtain current feedback measurements (I) and piston displacement feedback measurements. For example, the control scheme 1000 can include a second-order generalized integrator 1150 (SOGI 1150) and a Park transform 1152 which, when used in tandem, can be configured to determine the actual d-axis current component $(I_d)$, the actual q-axis current component $(I_q)$, and the actual DC current component $(I_0)$ of the current feedback measurements (I). In order to determine the actual d-axis current component $(I_d)$, the actual q-axis current component $(I_q)$, and the actual DC current component $(I_0)$ of the current feedback measurements, the SOGI 1150 uses the frequency component ($\omega$) of the piston displacement feedback measurements, and the Park Transform 1152 uses the phase component ($\theta$) of the piston displacement feedback measurements.

The controller (e.g., via control scheme 1000) can be configured to determine a flux weakening current difference (e.g., a flux weakening current error) between the target d-axis current component $$I_d^*$$

and the actual d-axis current component $(I_d)$ of the current feedback measurements obtained at (904). For instance, referring still to FIG. 11B, the control scheme 1000 can be configured to determine a flux weakening difference (e.g., via a comparator 1154) between the target d-axis current $$I_d^*$$

and the actual d-axis current component $(I_d)$ of the current feedback measurements (I).

The controller (e.g., via control scheme 1000) can be configured to determine a stroke current difference (e.g., a stroke current error) between the target q-axis current $$I_q^*$$

and the actual q-axis current component $(I_q)$ of the current feedback measurements obtained at (904). For instance, the control scheme 1000 can be configured to determine a stroke difference (e.g., via a comparator 1156) between the q-axis current setpoint $$I_q^*$$

and the actual q-axis current component $(I_q)$ of the current feedback measurements (I).

The controller (e.g., via control scheme 1000) can be configured to determine a capacity current difference (e.g., a capacity current error) between the target DC current $$I_0^*$$

22 and the actual DC current component $(I_0)$ of the current feedback measurements obtained at (904). For instance, the control scheme 1000 can be configured to determine a capacity difference (e.g., via a comparator 1158) between the DC current setpoint $$I_0^*$$

and the actual DC current component $(I_0)$ of the current feedback measurements (I).

Referring still to FIG. 11B, the controller (e.g., via control scheme 1000) can be configured to adjust a d-axis voltage setpoint based, at least in part, on the flux weakening current difference. For instance, the control scheme 1000 can include a flux weakening current proportional-integral controller (PI) 1160 (e.g., $I_d$ Current PI 1160). The flux weakening current PI 1160 can be configured to determine the d-axis voltage component $(V_d)$ based, at least in part, on the flux weakening current difference determined via the comparator 1154. As used herein, "d-axis voltage setpoint" can refer to the d-axis voltage component $(V_d)$. Those of ordinary skill in the art will understand that the d-axis voltage setpoint can be adjusted in any suitable manner without deviating from the scope of the present disclosure.

The controller (e.g., via control scheme 1000) can be configured to adjust a q-axis voltage setpoint based, at least in part, on the stroke current difference. For instance, the control scheme 1000 can include a stroke current PI 1162 (e.g., $I_q$ Current PI 1162). The stroke current PI 1162 can be configured to determine the q-axis voltage component $(V_q)$ based, at least in part, on the stroke current difference determined via the comparator 1156. As used herein, "q-axis voltage setpoint" can refer to the q-axis voltage component $(V_q)$. Those of ordinary skill in the art will understand that the q-axis voltage setpoint can be adjusted in any suitable manner without deviating from the scope of the present disclosure.

The controller (e.g., via control scheme 1000) can be configured to adjust a DC voltage setpoint based, at least in part, on the capacity current difference. For instance, the control scheme 1000 can include a capacity current PI 1164 (e.g., $I_0$ Current PI 1164). The capacity current PI 1164 can be configured to determine the DC voltage component $(V_0)$ based, at least in part, on the capacity current difference determined via the comparator 1158. As used herein, "DC voltage setpoint" can refer to the DC voltage component $(V_0)$. Those of ordinary skill in the art will understand that the DC voltage setpoint can be adjusted in any suitable manner without deviating from the scope of the present disclosure.

Furthermore, referring to FIG. 11B, the d-axis voltage setpoint $(V_d)$ can be combined with the phase of the piston displacement ($\theta$) at 1166, and the q-axis voltage setpoint $(V_q)$ can be combined with the phase of the piston displacement ($\theta$) at 1168. The voltage values determined at 1166 and 1168 can then be summed, at 1170, with the DC voltage setpoint $(V_0)$ to calculate the total voltage (V) necessary to drive the motor. The total voltage (V) can then be sent to the inverter 1010. The total voltage (V) can also be sent to the flux weakening controller 1002. Accordingly, the total voltage (V) is given by:

$$V = V_d \sin \theta + V_q \cos \theta + V_0$$

Referring now to FIG. 11C, the flux weakening controller 1002 can be configured to receive the voltage feedback measurement obtained at (904). More particularly, the total voltage (V) can be sent to the flux weakening controller 1102 as the voltage feedback measurement. The total voltage (V) can be provided to a peak detector 1172 configured to determine a peak ($V_{peak}$) (i.e., maximum absolute value) of the total voltage (V). The peak ($V_{peak}$) can then be compared (e.g., at a comparator 1174) to the voltage threshold ($V_{dc}$) to determine a voltage difference ($V_{diff}$). The voltage difference ($V_{diff}$) can be provided to a current selector 1176. The current selector 1176 may be configured to adjust the target d-axis current component $$I_d^*$$

For instance, the current selector 1176 may a controller (e.g., a proportional (P) controller, a proportional-integral (PI) controller, etc.) configured to set the target d-axis current component $$I_d^*$$

such that the peak ($V_{peak}$) is less than the voltage threshold ($V_{dc}$). As an example, the current selector 1176 may be configured to set the target d-axis current component $$I_d^*$$

to zero (0) when the peak ($V_{peak}$) is less than the voltage threshold ($V_{dc}$). In such situations, the controller (e.g., via the control scheme 1000) can be configured to control the motor without implementing the flux weakening operation. Hence, the controller can be configured to operate the motor at maximum efficiency. As another example, the current selector 1176 may be configured to set the target d-axis current component $$(I_d^*)$$

to a negative value when the peak ($V_{peak}$) is greater than or equal to the voltage threshold ($V_{dc}$). In such situations, the controller (e.g., via the control scheme 1000) can be configured to control the motor so as to implement the flux weakening operation. Hence, the controller can be configured to operate the motor at a reduced efficiency in exchange for operating the motor at longer strokes otherwise prohibited by voltage capabilities of the motor.

Referring now to FIG. 12, a controller can be operably coupled to the motor of the linear compressor and can be configured to implement a single-phase phasor-like control scheme (e.g., control scheme 1200) to operate a motor of the linear compressor in order to drive a rotor (e.g., rotor coupled to piston 130) of the motor. More particularly, the control scheme 1200 can include a flux weakening controller 1202, and a stroke controller 1204 (e.g., clearance controller 1004). As discussed in more detail below, the flux weakening controller 1202 can be configured to control a target velocity-current phase difference $$(\theta_{v-I}^*)$$

of the motor, and the stroke controller 1004 (e.g., clearance controller 1004) can be configured to control a target current $$(I_{rms}^*)$$

of the motor. The control scheme 1200 can further include a voltage calculation module 1208. The voltage calculation module 1208 can be operatively coupled to the flux weakening controller 1202 and the stroke controller 1204. The control scheme 1200 can further include an inverter 1210 configured to supply a variable frequency waveform to the motor. Furthermore, as will be discussed in greater detail below, the voltage calculation module 1208 can be configured to determine the requisite voltage (V) needed by the inverter 1210 in order to drive the motor based, at least in part, on the target velocity-current phase difference $$(\theta_{v-I}^*)$$

and the target current $$(I_{rms}^*).$$

The stroke controller 1004 can be configured to control the target current $$(I_{rms}^*)$$

of the motor. More particularly, in some embodiments, the stroke controller 1004 can be configured to adjust the target current $$(I_{rms}^*)$$

based, at least in part, on the one or more feedback measurements (e.g., current feedback) obtained at (904). The controller (e.g., via control scheme 1200) can be further configured to determine a current difference ($I_{diff}$) (e.g., a current error) between the target current $$(I_{rms}^*)$$

and the actual current ($I_{rms}$) of the current feedback measurements obtained at (904). For instance, the control scheme 1200 can be configured to determine the current difference ($I_{diff}$) (e.g., via a comparator 1212) between the target current $$(I_{rms}^*)$$

and the actual current component ($I_{rms}$) of the current feedback measurements (I).

Referring still to FIG. 12, the controller (e.g., via control scheme 1200) can be configured to adjust a voltage setpoint ($V_p$) based, at least in part, on the current difference ($I_{diff}$). For instance, the control scheme 1200 can include a current proportional-integral controller (PI) 1214. The current PI 1214 can be configured to determine the voltage setpoint ($V_p$) based, at least in part, on the current difference ($I_{diff}$). The voltage setpoint ($V_p$) can then be sent to the voltage calculation module 1208 and the flux weakening controller 1202. Those of ordinary skill in the art will understand that the voltage setpoint ($V_p$) can be adjusted in any suitable manner without deviating from the scope of the present disclosure.

The flux weakening controller 1202 can be configured to receive the voltage feedback measurement obtained at (904). More particularly, the voltage setpoint ($V_p$) can be sent to the flux weakening controller 1202 as the voltage feedback measurement. The flux weakening controller 1202 can be configured to adjust the target velocity-current phase difference $$(\theta^*_{v-I})$$

based, at least in part, on the voltage setpoint ($V_p$). For instance, the flux weakening controller 1202 can be configured to determine the voltage difference ($V_{diff}$) (e.g., via a comparator 1216) between the voltage setpoint ($V_p$) and the voltage threshold ($V_{dc}$). The voltage difference ($V_{diff}$) can be provided to a phase selector 1218. The flux weakening controller 1002 may also receive additional feedback measurements (e.g., current feedback measurements).

The phase selector 1218 may be configured to adjust the target velocity-current phase difference $$(\theta^*_{v-I}).$$

For instance, the phase selector 1218 may be a controller (e.g., a proportional (P) controller, a proportional-integral (PI) controller, etc.) configured to set the target velocity-current phase difference ($\theta^*_{v-I}$) such that the voltage setpoint ($V_p$) is less than the voltage threshold ($V_{dc}$). As an example, the phase selector 1218 may be configured to set the target velocity-current phase difference $$(\theta^*_{v-I})$$

to zero (0) when the voltage setpoint ($V_p$) is less than the voltage threshold ($V_{dc}$). In such situations, the controller (e.g., via the control scheme 1200) can be configured to control the motor without implementing the flux weakening operation. Hence, the controller can be configured to operate the motor at maximum efficiency. As another example, the phase selector 1218 may be configured to set the target velocity-current phase difference $$(\theta^*_{v-I})$$

to a negative value when the voltage setpoint ($V_p$) is greater than or equal to the voltage threshold ($V_{dc}$). In such situations, the controller (e.g., via the control scheme 1000) can be configured to control the motor so as to implement the flux weakening operation. Hence, the controller can be configured to operate the motor at a reduced efficiency in exchange for operating the motor at longer strokes otherwise prohibited by voltage capabilities of the motor.

The controller (e.g., via control scheme 1200) can be configured to determine a phase difference ($\theta_{diff}$) (e.g., a phase error) between the target velocity-current phase difference $$(\theta^*_{v-I})$$

and the actual velocity-current phase difference ($\theta_{v-1}$) of the phase feedback measurements obtained at (904). For instance, the control scheme 1200 can be configured to determine the phase difference ($\theta_{diff}$) between the velocity-current phase difference setpoint $$(\theta^*_{v-I})$$

and the actual velocity-current phase difference ($\theta_{v-1}$) of the phase feedback measurements ($\theta$) via a comparator 1220.

Referring still to FIG. 12, the controller (e.g., via control scheme 1200) can be configured to adjust a frequency setpoint (f) based, at least in part, on the phase difference ($\theta_{diff}$). For instance, the control scheme 1200 can include a resonance proportional-integral controller (PI) 1222. The resonance PI 1222 can be configured to determine the frequency setpoint (f) based, at least in part, on the phase difference ($\theta_{diff}$). The frequency setpoint (f) can then be sent to the voltage calculation module 1208. Those of ordinary skill in the art will understand that the frequency setpoint (f) can be adjusted in any suitable manner without deviating from the scope of the present disclosure.

Furthermore, the frequency setpoint (f) can be combined with the voltage setpoint ($V_p$) to calculate the total voltage (V) necessary to drive the motor. The total voltage (V) can then be sent to the inverter 1010. Accordingly, the total voltage (V) is given by:

$$V = V_p \sin 2\pi ft$$

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for operating a linear compressor of an appliance, the method comprising:

operating a motor of the linear compressor in order to drive a rotor of the motor;

obtaining, via a controller of the linear compressor, a voltage feedback measurement of the motor;

adjusting, via the controller, a control setpoint for the motor based on the voltage feedback measurement and a voltage threshold; and controlling, via the controller, the motor of the linear compressor based, at least in part, on the adjusted control setpoint so as to implement a flux weakening operation when the voltage feedback measurement is greater than or equal to the voltage threshold.

2. The method of claim 1, wherein the voltage threshold is determined based on a DC bus voltage of a motor drive of the motor.

3. The method of claim 1, wherein the motor is controlled using a single-phase phasor based control scheme.

4. The method of claim 3, wherein the control setpoint is a target velocity-current phase difference.

5. The method of claim 1, wherein the motor is controlled using a single-phase vector based control scheme.

6. The method of claim 5, wherein the control setpoint is a target d-axis current component.

7. The method of claim 1, wherein adjusting the control setpoint for the motor so as to implement the flux weakening operation based on the voltage feedback measurement and the voltage threshold comprises:

comparing the voltage feedback measurement to the voltage threshold; and setting the control setpoint to a negative value when the voltage feedback measurement is greater than or equal to the voltage threshold.

8. A linear compressor defining an axial direction and a vertical direction, the linear compressor for an appliance comprising:

a cylindrical casing defining a compressor chamber;

a piston positioned within the compressor chamber and being movable along the axial direction;

a motor operably coupled to the piston; and a controller configured to perform operations for controlling the motor, the operations comprising:

operating the motor in order to drive a rotor of the motor;

obtaining a voltage feedback measurement of the motor;

adjusting a control setpoint for the motor so as to implement a flux weakening operation based on the voltage feedback measurement and a voltage threshold; and controlling the motor based, at least in part, on the adjusted control setpoint when the voltage feedback measurement is greater than or equal to the voltage threshold.

9. The linear compressor of claim 8, wherein the voltage threshold is determined based on a DC bus voltage of a motor drive of the motor.

10. The linear compressor of claim 8, wherein:

the motor is controlled using a single-phase phasor based control scheme; and the control setpoint is a target velocity-current phase difference.

11. The linear compressor of claim 8, wherein:

the motor is controlled using a single-phase vector based control scheme; and the control setpoint is a target d-axis current component.

12. The linear compressor of claim 8, wherein adjusting the control setpoint for the motor so as to implement the flux weakening operation based on the voltage feedback measurement and the voltage threshold comprises:

comparing the voltage feedback measurement to the voltage threshold; and setting the control setpoint to a negative value when the voltage feedback measurement is greater than or equal to the voltage threshold.

13. The linear compressor of claim 8, wherein:

the piston is a reciprocating piston; and the motor is a single-phase linear motor.

14. An appliance, comprising:

a cabinet defining an internal chamber;

a door rotatably mounted to the cabinet to provide selective access to the internal chamber;

a linear compressor, the linear compressor having a piston movable in a negative axial direction toward a compressor chamber and a positive axial direction away from the compressor chamber;

a motor operably coupled to the piston;

an inverter configured to supply a variable frequency waveform to the motor; and a controller configured to perform operations for controlling the motor, the operations comprising:

operating the motor in order to drive a rotor of the motor;

obtaining a voltage feedback measurement of the motor;

adjusting a control setpoint for the motor so as to implement a flux weakening operation based on the voltage feedback measurement and a voltage threshold; and controlling the motor based, at least in part, on the adjusted control setpoint when the voltage feedback measurement is greater than or equal to the voltage threshold.

15. The appliance of claim 14, wherein the voltage threshold is determined based on a DC bus voltage of the inverter.

16. The appliance of claim 14, wherein:

the motor is controlled using a single-phase phasor based control scheme; and the control setpoint is a target velocity-current phase difference.

17. The appliance of claim 14, wherein:

the motor is controlled using a single-phase vector based control scheme; and the control setpoint is a target d-axis current component.

18. The appliance of claim 14, wherein adjusting the control setpoint for the motor so as to implement the flux weakening operation based on the voltage feedback measurement and the voltage threshold comprises:

comparing the voltage feedback measurement to the voltage threshold; and setting the control setpoint to a negative value when the voltage feedback measurement is greater than or equal to the voltage threshold.

19. The appliance of claim 14, wherein:

the piston is a reciprocating piston; and the motor is a single-phase linear motor.

20. The appliance of claim 14, wherein the appliance is a refrigerator appliance.

* * * * *